US009366451B2

(12) United States Patent
Guo et al.

(10) Patent No.: US 9,366,451 B2
(45) Date of Patent: Jun. 14, 2016

(54) SYSTEM AND METHOD FOR THE DETECTION OF FAULTS IN A MULTI-VARIABLE SYSTEM UTILIZING BOTH A MODEL FOR NORMAL OPERATION AND A MODEL FOR FAULTY OPERATION

(75) Inventors: Ying Guo, Eastwood (AU); Jiaming Li, Denistone East (AU); Sam West, Wallsend (AU); Joshua Wall, Merewether (AU); Glenn Platt, Speers Point (AU)

(73) Assignee: Commonwealth Scientific and Industrial Research Organisation, Campbell ACT (AU)

( * ) Notice: Subject to any disclaimer, the term of this patent is extended or adjusted under 35 U.S.C. 154(b) by 322 days.

(21) Appl. No.: 13/336,153

(22) Filed: Dec. 23, 2011

(65) Prior Publication Data

US 2012/0185728 A1      Jul. 19, 2012

(30) Foreign Application Priority Data

Dec. 24, 2010   (AU) ................................. 2010905662

(51) Int. Cl.
  *F24F 11/00*   (2006.01)
  *G06N 99/00*   (2010.01)
  *G06K 9/62*    (2006.01)

(52) U.S. Cl.
  CPC .......... *F24F 11/0009* (2013.01); *G06K 9/6256* (2013.01); *G06N 99/005* (2013.01); *F24F 2011/0052* (2013.01)

(58) Field of Classification Search
  CPC ........................... G06N 99/005; G06K 9/6256
  USPC .......................................................... 706/12
  See application file for complete search history.

(56) References Cited

U.S. PATENT DOCUMENTS 5,864,773 A *   1/1999   Barna et al. ..................... 702/85
2003/0114986 A1   6/2003   Padmanabhan et al.
(Continued)

FOREIGN PATENT DOCUMENTS

| CA | 2 334 908 A1 | 2/2011 |
| GB | 2427726 A  * | 1/2007 |
| GB | 2427726 B    | 5/2011 |

OTHER PUBLICATIONS

Najafi et al., Modeling and Measurement Constraints in Fault Diagnostics for HVAC Systems, ASME Journal of Dynamic Systems, Measurement, and Controls, 2010.*
(Continued)

*Primary Examiner* — Stanley K Hill
*Assistant Examiner* — Robert H Bejcek, II
(74) *Attorney, Agent, or Firm* — Merchant & Gould P.C.

(57) ABSTRACT

A method for detecting faulty operation of a multi-variable system is described. The method includes receiving operational data from a plurality of components of the multi-variable system and processing the operational data in accordance with a plurality of dynamic machine learning fault detection models to generate a plurality of fault detection results. Each fault detection model uses a plurality of variables to model one or more components of the multi-variable system and is adapted to detect normal or faulty operation of an associated component or set of components of the multi-variable system. The plurality of fault detection results are output.

39 Claims, 13 Drawing Sheets

(56) References Cited

U.S. PATENT DOCUMENTS

2004/0267395 A1    12/2004   Discenzo et al.
2008/0033674 A1    2/2008   Nikovski et al.

OTHER PUBLICATIONS

Najafi et al., Application of Machine Learning in Fault Diagnostics of Mechanical Systems, Proceedings of the World Congress on Engineering and Computer Science 2008, Oct. 22-24, 2008.*

Isermann, Rolf, Process Fault Detection Based on Modeling and Estimation Methods—A Survey, Automatica, vol. 20, No. 4, pp. 387-404, 1984.*

Thorsley et al. Diagnosability of Stochastic Discrete-Event Systems. IEEE Transactions on Automatic Control, vol. 50, No. 4, pp. 476-492, Apr. 2005.*

Rabiner, L.R. "A Tutorial on Hidden Markov Models and Selected Applications in 25 Speech Recognition", Proceedings of the IEEE, vol. 77, No. 2, 1989, pp. 257-286.

Hartigan, J.A. et al. "Algorithm AS 136: A K-Mean Clustering Algorithm", Journal of the Royal Statistical Society, Series C (Applied Statistics), vol. 28, No. 1, 1979, pp. 100-108.

Sasiadek, J.Z. et al. "Sensor Data Fusion Using Kalman Filter", Proceedings of the Third International Conference on Information Fusion, vol. 2, 2000, pp. 19-25.

Jabbari, A. et al. "Neural Network based Data Fusion in Food Transportation System", 11th International Conference on 20 Information Fusion, Cologne, Germany, 2008, pp. 1-8.

Chunli, X. et al. "Research on Data Fusion Diagnosis System Based on Neural Network D-S Evidence Theory", IEEE Circuits and Systems International Conference on Testing and Diagnosis, 2009, pp. 1-4.

Cortes, C. et al. "Support Vector Networks", Machine Learning 20, 1995, pp. 273-297.

International-Type Search Report for corresponding Australian Patent Application No. 2010905662 mailed Feb. 3, 2011.

Katipamula et al. "Methods for Fault Detection, Diagnostics, and Prognostics for Building Systems—A review, Part I", HVAC&R Research, vol. 11, No. 1, Jan. 2005, pp. 3-25.

Katipamula et al. "Methods for Fault Detection, Diagnostics, and Prognostics for Building Systems—A review, Part II", HVAC&R Research, vol. 11, No. 2, Apr. 2005, pp. 169-187.

Linsell et al. "Bringing Existing High Efficiency Buildings Back into Line", AIRAH Pre-loved Buildings Conference, Melbourne, Australia, paper (section 4.1), Draft for consideration sent Nov. 3, 2009, Paper published in conference proceedings on Nov. 19, 2009.

Wall et al. "A Dynamic Machine Learning-Based Technique for Automated Fault Detection in HVAC Systems", ASHRAE Annual Conference Paper (Abstract only), Montreal, Quebec, Canada, Jun. 2011.

Li et al. "Fault Diagnosis for High-Level Applications Based on Dynamic Bayesian Network", Management Enabling the Future Internet for Changing Business and New Computing Services, 12th Asia-Pacific Network Operations and Management Symposium, APNOMS 2009, Jeju, South Korea, Sep. 23-25, 2009, pp. 61-70.

\* cited by examiner

SYSTEM AND METHOD FOR THE DETECTION OF FAULTS IN A MULTI-VARIABLE SYSTEM UTILIZING BOTH A MODEL FOR NORMAL OPERATION AND A MODEL FOR FAULTY OPERATION

This application claims benefit of Serial No. 2010905662, filed 24 Dec. 2010 in Australia and which application is incorporated herein by reference. To the extent appropriate, a claim of priority is made to each of the above disclosed applications.

FIELD OF THE INVENTION

The present invention relates to systems and methods for detecting and/or diagnosing faults in multi-variable systems. The invention is particularly suitable for detecting and diagnosing faults in heating, ventilation and air-conditioning (HVAC) systems and will be described in relation to that exemplary but non-limiting embodiment.

BACKGROUND OF THE INVENTION

A wide variety of systems can be descried as multi-variable systems. For example systems such as building heating, ventilation and air-conditioning (HVAC) systems, refrigeration systems, energy distribution systems, automated lighting systems, security/alarm systems, smoke/fire detection systems, and gas detection systems.

Multi-variable systems such as these commonly fail to satisfy performance expectations envisioned at design time. Such failings can be due to a number of factors, such as problems caused by improper installation, inadequate maintenance, or equipment failure. These problems, or "faults," can include mechanical failures, sensor failures/errors, control problems, design errors, and inappropriate operator intervention. Due to the complexity of such multi-variable systems, it is relatively common for faults to go unnoticed for extended periods of time, and only identified when they become significant enough to cause complete equipment failure, excessive power consumption, and/or sufficient performance degradation to trigger user complaints.

By way of one example, faults in HVAC systems may be caused be a variety of factors. Mechanical faults can include stuck, broken, or leaking valves, dampers, or actuators, fouled heat exchangers, or other damaged/inoperative components. Control problems ran relate to failed or drifting sensors, poor feedback loop tuning or incorrect sequencing logic.

A variety of fault detection and diagnostic (FDD) techniques for multi-variable systems are known, and their use provides for a number of benefits. By detecting and acting on faults in multi-variable systems significant energy savings can be realised. Additionally, if minor faults are detected before becoming major problems, the useful service life of equipment can be extended, maintenance costs can be reduced, and repairs can be scheduled when convenient (avoiding downtime and overtime work).

Further, and again using a HVAC system by way of example, detecting faults allows for better control of temperature, humidity, and ventilation of occupied spaces. This, in turn, can improve employee productivity, guest/customer comfort, and/or product quality control.

Many current fault detection techniques for multi-variable systems are rule-based. The fault detection system integrates and interprets incoming data in accordance with a pre-determined set of rules, produces a risk profile, and autonomously initiates a response to a breach of these rules. Rule-based systems are, however, limited insofar as they are very specifically derived for/tailored to a particular system and are very difficult to update, change, or adapt to a different system. Additionally, rule-based systems typically fail miserably if conditions beyond the boundaries of the knowledge incorporated in them are encountered.

Although less common, another class of fault detection techniques used for multi-variable systems are qualitative model-based systems. Qualitative model-based systems use analytical mathematical models to identify faults. As with rule-based systems, however, qualitative model-based systems have a number of limitations. For example, qualitative model-based systems are generally complex and computationally intensive, and a large amount of skilled work is required to develop a model for a particular system. Also, in order to create a usable model many inputs are required to describe the system being modelled, and the values of some of the required inputs may not be readily available.

In addition to the above limitations, most multi-variable systems are installed in different buildings/environments. This generally means that rules or analytical models developed for a particular system cannot be easily applied to an alternative system. As such, the difficult process of determining and setting rules or generating analytical mathematical models must be tailored to each individual building/environment. In addition, the task of setting the thresholds used by such systems to raise alarms is involved, and prone to producing false alarms. Also, building conditions such as structure of the internal architecture design and even external factors (such as shading and the growth of plant life) often change after the system installation/initialisation of a fault detection system, which can require rules/models that were originally appropriate to be revisited and updated.

It would be desirable to provide a fault detection system and/or method which overcomes or ameliorates one or more of the limitations of existing fault detection systems/methods. In the alternative, it would be desirable to provide a useful alternative to existing fault detection systems and methods.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In one aspect the present invention provides a method for detecting faulty operation of a multi-variable system, the method including: receiving operational data from a plurality of components of the multi-variable system; processing the operational data in accordance with a plurality of dynamic machine learning fault detection models to generate a plurality of fault detection results, each fault detection model using a plurality of variables to model one or more components of the multi-variable system and being adapted to detect normal or faulty operation of an associated component or set of components of the multi-variable system; and outputting the plurality of fault detection results.

At least one fault detection model may be adapted to detect normal operation of its associated component or set of components.

At least one fault detection model may be adapted to detect faulty operation of its associated component or set of components.

At least two fault detection models may be adapted to detect normal or faulty operation of different associated components or sets of components.

The plurality of fault detection models may include: at least one general fault detection model adapted to detect normal or faulty operation of a general set of components of the multi-variable system; and at least one specific fault detection model adapted to detect normal or faulty operation of a specific component or set of components of the multi-variable system, wherein each specific fault detection model is associated with a general fault detection model, and the component or set of components associated with the specific fault detection model is a subset of or related to the set of components of the associated general fault detection model.

At least one of the general fault detection models may be adapted to detect normal or faulty operation of the multi-variable system as a whole.

The operational data may be processed only in accordance with the at least one specific fault detection model if processing the operational data in accordance with the associated general fault detection model indicates the existence of a fault.

If both a general fault detection process and a specific fault detection process associated with that general fault detection process indicate faulty operation of the multi-variable system, the fault may be diagnosed as a fault in the component or set of components associated with the specific fault detection process.

At least one of the plurality of fault detection models may be selected from a group including dynamic Bayesian network based fault detection models and hidden Markov model based fault detection models.

The method may further include: processing the plurality of fault detection results in accordance with a data fusion process to generate a fused fault detection result, the fused fault detection result including information as to whether a fault is perceived in the operation of the multi-variable system; and outputting said fused fault detection result.

The data fusion process may be a Dempster-Shafer based data fusion process.

The method may further include: for each of the plurality of fault detection results calculating an associated confidence level; and using the calculated confidence levels to select which of the plurality of fault detection results is or are likely to be correct.

The method may further include fusing said plurality of confidence levels to provide a fused confidence level result; and using said fused confidence level result along with said fused fault detection result to determine the existence of and diagnose a fault in the multi-variable system.

Said confidence levels may be belief masses calculated according to a Dempster-Shafer based process.

The method may further include: selecting one or more of the fault detection results based on the confidence level associated with the fault detection result; generating a set of variables, the set of variables including the variables modelled by the fault detection models which generated the selected fault detection results; and outputting said set of variables for use in diagnose a fault in the multi-variable system.

The method may further include: processing the operational data in accordance with at least one of the fault detection models multiple times to generate multiple results from said at least one fault detection model, and clustering the multiple results in accordance with a clustering algorithm in order to increase the reliability of the fault detection result.

The clustering algorithm may be a K-means clustering algorithm.

If two of the fault detection results are contradictory, the method may further include: flagging one or both of the fault detection models yielding the contradictory results; and modifying and/or retraining the or each flagged fault detection model.

If a fault detection result is identified as being a false alarm, the method may further include: flagging the fault detection model yielding the result identified to be a false alarm; and modifying and/or retraining the flagged fault detection models.

The method may further include using said flagged fault detection models to modify the clustering algorithm in order to improve the clustering of the multiple search results.

The multi-variable system may be a HVAC system.

The HVAC system may be configured to control environmental conditions in connection with human thermal comfort in a building.

Alternatively, the multi-variable system may be selected from a group including: a refrigeration system; an energy distribution system; an automated lighting system; a security/alarm system; a smoke/fire detection system; and a gas detection system.

Also described herein is a method for detecting faulty operation of a multi-variable system, the method including: receiving operational data from a plurality of components of the multi-variable system; processing the operational data in accordance with a first fault detection process to generate a first fault detection result, the first fault detection result indicating whether according to the first fault detection process the operational data represents normal or faulty operation of the multi-variable system; processing the operational data in accordance with a second fault detection process to generate a second fault detection result, the second fault detection result indicating whether according to the second fault detection process the operational data represents normal or faulty operation of the multi-variable system; processing the first and second fault detection results in accordance with a data fusion process to provide a fused fault detection result, the fused fault detecting result including information as to whether a fault is perceived in the operation of the multi-variable system; and outputting said fused fault detection result.

At least one of the first and second fault detection processes may be a machine-learning based fault-detection process, and the components of the multi-variable system may variables in the machine-learning based fault-detection processes.

The first and/or second fault detection processes may be a dynamic Bayesian network based fault detection process or a hidden Markov model based fault detection process.

The data fusion process may be a Dempster-Shafer based data fusion process.

The first and second fault detection processes may be of the same general type of fault detection process; the first fault detection process may be trained to detect a first type of fault in the multi-variable system; and the second fault detection process may be trained to detect a second type of fault in the multi-variable system, the first type of fault being different to the second type of fault.

Alternatively, the first fault detection process may be of a first type of fault detection process; the second fault detection process may be of a second type of fault detection process; and the first and second fault detection processes may be trained to detect the same type of fault in the multi-variable system.

Further alternatively, the first fault detection process may be of a first type of fault detection process; the second fault detection process may be of a second type of fault detection process; the first fault detection process may be trained to detect a first type of fault in the multi-variable system; and the second fault detection process may be trained to detect a second type of fault in the multi-variable system, the first type of fault being different to the second type of fault.

The fault detected by the first and second fault detection processes may include at least one fault selected from a group including: general abnormal operation of the multi-variable system and abnormal operation of a specific component of the multi-variable system.

The method may further include: calculating a first level of confidence representing the level of confidence in the first fault detection result; calculating a second level of confidence representing the level of confidence in the second fault detection result; fusing said first and second levels of confidence to provide a fused confidence level result; and using said fused confidence level result along with said fused fault detection result to determine the existence of a fault in the multi-variable system.

The first and second levels of confidence may respectively be first and second belief masses calculated according to a Dempster-Shafer based process.

The method may further include: processing the operational data in accordance with at least one further fault detection process to generate at least one further fault detection result, the at least one further fault detection result indicating whether according to the at least one further fault detection process the operational data represents normal or faulty operation of the multi-variable system; processing the at least one further fault result along with the first and second fault detection results in accordance with the data fusion process to provide the fused fault detection result.

The at least one further fault detection processes may be a machine-learning based fault-detection process.

The or each at least one further fault detection process may be of the same general type of fault detection process. Alternatively, the or each further fault detection process may be a different type of fault process to the first and second fault detection processes.

The method may further include: calculating at least one further level of confidence representing the level of confidence in the at least one further fault detection result; fusing the at least one further level of confidence with the first and second levels of confidence to provide a fused confidence result.

Also described herein is a method for detecting faulty operation of a HVAC system, the method including: receiving previous operational data from a plurality of components of the HVAC system; receiving current operational data from a plurality of components of the HVAC system; processing the previous operational data and the current operational data in accordance a dynamic machine-learning based fault detection process to generate a fault detection result, the fault detection result including information as to whether a fault is perceived in the operation of the HVAC system; and outputting said fault detection result.

The method may further include developing and training the dynamic machine-learning based fault detection process prior to processing the operational data in accordance therewith.

Developing the dynamic machine-learning based fault detection process may include developing a model of the HVAC system, the model including a plurality of nodes representing variables within the HVAC system and a plurality of links, each link being between two nodes and representing a relationship between those nodes.

The plurality of links may include: intra-slice links, each intra-slice link being between two nodes in a same time slice; and inter-slice links, each inter-slice link being between two nodes in different time slices.

The dynamic machine-learning based fault detection processes may be a dynamic Bayesian network based fault detection process or a hidden Markov Model based fault detection process.

A further aspect the present invention provides computer readable instructions executable by a computer processor to implement the methods as described in one or more of the above statements.

A further aspect the present invention provides a computer readable storage medium readable by a computer processor, the storage medium storing instructions according the above statement.

A further aspect the present invention provides a computer system including a microprocessor and associated memory, a communications interface, at least one input interface, and at least one output interface, the memory storing instructions that, when executed, cause the computer system to implement the methods described in one or more of the above statements.

BRIEF DESCRIPTION OF THE DRAWINGS/FIGURES

An embodiment of the invention will be described with reference to the accompanying Figures in which.

DETAILED DESCRIPTION OF THE EMBODIMENTS

Broadly speaking, the present invention relates to systems and methods for detecting faults in a multi-variable system. In order to illustrate the features of the invention, examples of the proposed fault detection system and method will be described in relation to HVAC systems. It is to be understood, however, that systems and processes according to invention may be used to detect faults in other multi-variable systems.

The system and method of the invention will typically be performed by a computing device, as discussed below, which receives data from various sensors/components of the system and/or external data sources, processes that data, and reports on the likelihood that the system is operating with one or more fault conditions. The computing device may, for example, be (or form part of) a broader building management system (BMS). Alternatively, the system may be a stand alone device.

The output of the fault detection system/process can then be used by diagnostic tools to diagnose what the precise nature of the detected fault or faults is likely to be, and initialise action to correct those faults.

A HVAC System

Figure 1:
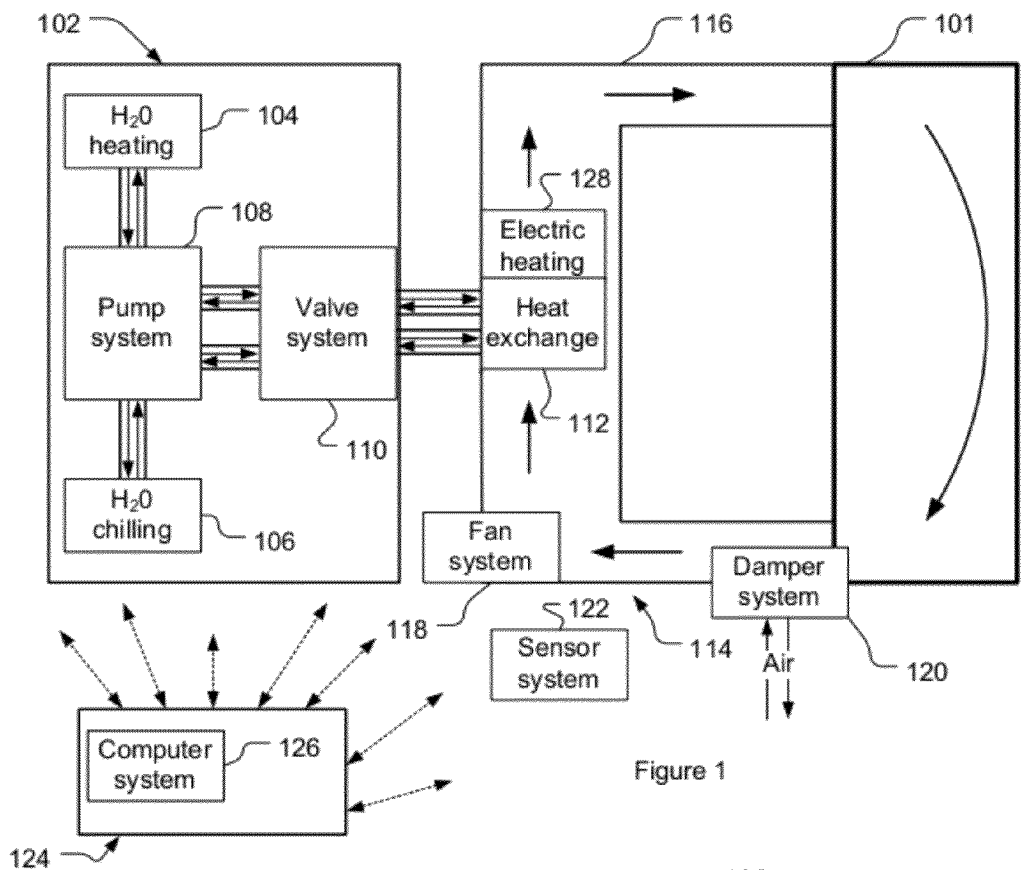
FIG. 1 is schematic diagram of a HVAC system.

FIG. 1 provides a high-level schematic diagram of a HVAC system 100. The HVAC system 100 is provided as one example of a multi-variable system with which the fault detection techniques of the present invention may be used.

Generally speaking, HVAC systems are configured and used to control the environment of a building or space. The environmental variables controlled may, for example, include temperature, air-flow, humidity etc. The desired values/setpoints of the environmental variables will depend on the intended use of the HVAC system.

Figure 13:
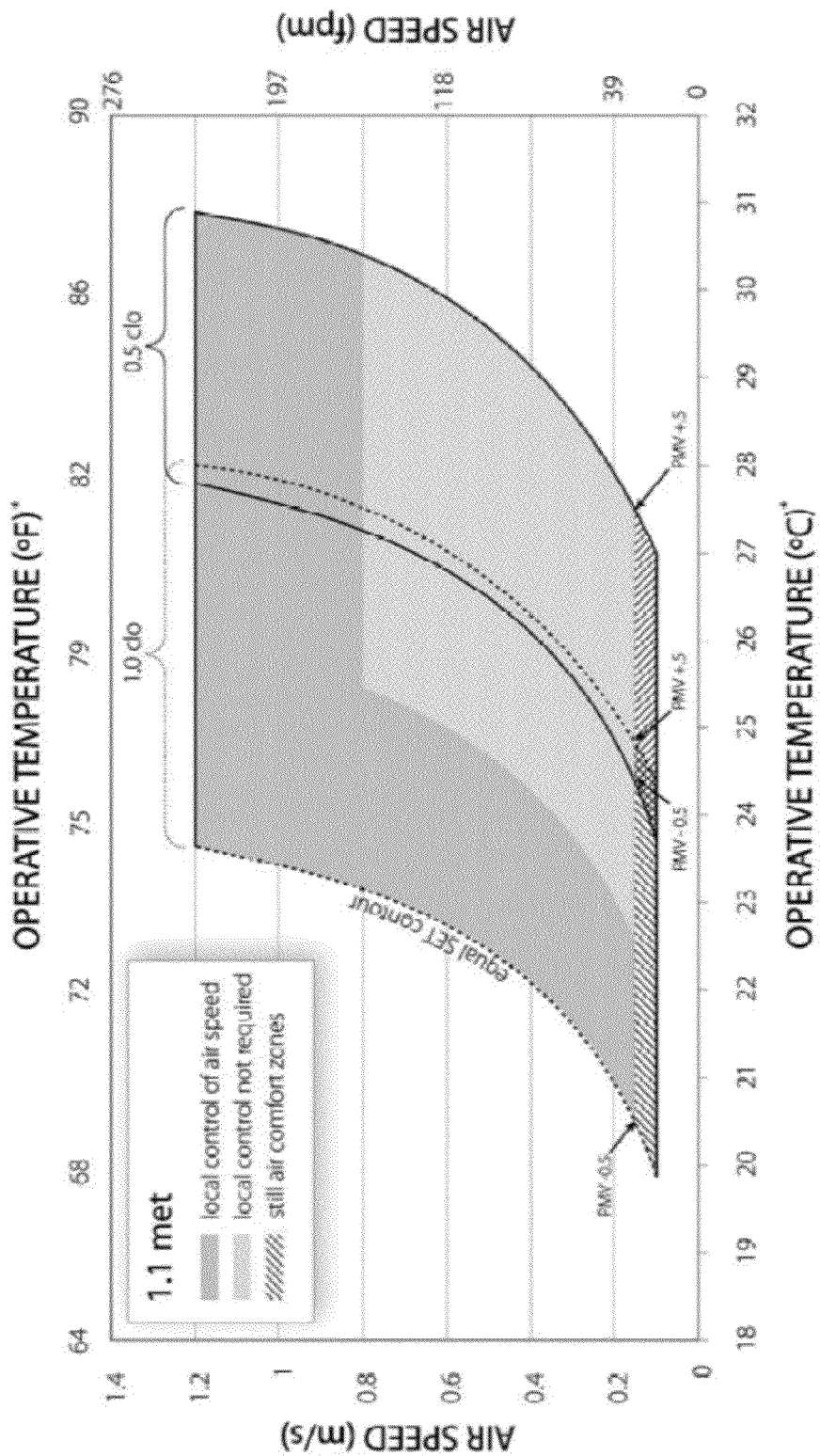
FIG. 13 is a graph showing the acceptable range of operative temperatures and air speeds for a particular metabolic rate and clothing levels.

For example, a HVAC system may be used in an occupied building/space, with the objective of the HVAC system being to make the building/space comfortable for human occupation. In this case the HVAC system may be configured to maintain conditions according to the graph shown in FIG. 13 (taken from ANSI/ASHRAE Standard 55-2010: Thermal Environmental Conditions for Human Occupancy) which shows the acceptable range of operative temperatures and air speeds for a particular metabolic rate and clothing levels.

Alternatively, a HVAC system used on a food/produce storage building/warehouse will be configured such that the environmental variables are set to maintain longevity, quality, and safety of the food/produce in question. Further alternatively, a single HVAC system may well be installed/configured to service different zones with different environmental requirements—e.g. in an office building there may be one or more human occupied zones with environmental variables set to optimise human comfort, and one or more equipment zones (e.g. computer server rooms) with environmental variables set to optimise conditions for the equipment.

A HVAC system 100 will typically service a number of zones within a building, though for the ease of illustration a single zone 101 is depicted. The system includes a central plant 102 which includes a hydronic heater 104 and hydronic chiller 106. A pump system 108, which may include dedicated heated and chilled water pumps, circulates heated and chilled water from the heater 104 and chiller 106 through a circuit of interconnected pipes. A valve system 110, which may include dedicated heated and chilled water valves, controls the flow of water into a heat exchange system 112 (which again, and for example, may include dedicated heated and chilled water coils). The heated and/or chilled water circulates through the heat exchange system 112 before being returned to the central plant 102 where the process repeats (i.e. the water is heated or chilled and recirculated). In the heat exchange system 112 energy from the heated/chilled water is exchanged with air being circulated through an air distribution system 114.

Heat can also be provided by alternative heating means, such as gas turbines (not shown), other thermal processes (not shown), or electric heating elements/systems 128 located in the building and/or air distribution system 114.

The air distribution system 114 includes a network of air ducts 116. Air is forced past the heat exchange system 112 by a fan system 118 (which will typically include a number of fans spaced throughout the network of air ducts 116), where energy is exchanged between the water and the circulating air in an attempt to modulate its temperature to a desired level or setpoint. The air then passes along supply ducts and into the zone 101 to be heated/cooled. Air from the zone 101 is then returned through the network of air ducts 116 either to be recirculated or exhausted: A damper system 120 (which will typically include a number of dampers) mixes the return air with outside air as required, after which the air is again forced past the heat exchange system 112.

The HVAC system 100 also includes a sensing system 122. The sensing system 122 will typically include a number of sensors located throughout the system, such as temperature sensors, humidity sensors, air velocity sensors, volumetric flow sensors, pressure sensors, gas concentration sensors, position sensors, and occupancy detection sensors.

The HVAC system 100 is controlled by a control system 124. Control system 124 may be a stand alone system, or may form part of (or be) a building automation system (BAS) or building management and control system (BMCS). The control system 124 includes a computing system 126 (an example of which is described below) which is in communication with the various components of the HVAC system 100. The control system 124 controls and/or receives feedback from the various components of the HVAC system 100 in order to regulate environmental conditions for the inhabitancy or functional purpose of the building.

In addition to using feedback from the components of the HVAC system 100 itself, the control system 124 may receive additional data/information of relevance. This may, for example, include data/information relating to energy consumption obtained from power meters, gas meters, or an energy management system (EMS)—a computer program and related hardware, contactors, breakers, sensors and energy measurement devices used to manage and control a building or sites energy transmission, distribution and usage. Additional data/information may also/alternatively include meteorological data and/or other data relevant to the operation of the HVAC system 100, such as operable window statuses, shading device statuses, light levels, solar radiation information, and building/zone occupancy data.

By way of non-limiting example, the data/information that the control system 124 uses in controlling the HVAC system 100 to regulate environmental conditions (and in detecting faults) may include one or more of:

speed data/information—e.g. fan speeds, pump speeds;

power data/information—e.g. fan power levels, pump power levels, chiller power levels, reheat power levels;

energy data/information—e.g. thermal energy, electrical energy;

status data/information—e.g. fan statuses, air handling unit statuses, economizer statuses, dehumidifier statuses;

status data/information—e.g. fan enable, pump enable, chiller enable, boiler enable, reheat enable, air handling unit (AHU) enable;

valve position data/information—e.g. hot water valve position, chilled water valve position;

damper position data/information—e.g. return air damper position, outside air damper position, recirculation air damper position;

air temperature data/information—e.g. supply air temperature, return air temperature, space air temperature, outside air temperature;

water temperature data/information—e.g. flow temperature, return temperature, buffer storage temperature;

relative humidity data/information—e.g. supply air humidity, return air humidity, space air humidity, outside humidity;

enthalpy data/information—e.g. return air enthalpy, outside air enthalpy;

setpoint data/information—e.g. supply air temperature setpoint, space air temperature setpoint, flow temperature setpoint, dehumidifier setpoint, fan speed setpoint, pump speed setpoint;

gas concentration data/information—e.g. return air $CO_2$ concentration, space air $CO_2$ concentration, outside $CO_2$ concentration;

velocity data/information—e.g. air velocity;

volumetric flow rate data/information—e.g. gas flow, water flow, air flow;

pressure data/information—e.g. duct differential pressure, barometric pressure;

load data/information—e.g. chilled water load, Hot water load;

totalisation data/information—e.g. fan running time, pump running time, chiller running time, boiler running time;

energy data/information—e.g. thermal energy, electrical energy, power, power quality, volumetric flow rate, temperature differential;

meteorological data/information—e.g. ambient temperature, apparent temperature, dew point, relative humidity, wet bulb temperature; and miscellaneous data/information—e.g. operable window status, shading device status, light level, solar radiation, occupancy detection.

As will be appreciated, while the above data/information is relevant to the operation and fault detection a HVAC system, alternative multi-variable systems will, of course, have different data/information for these purposes. By way of example, the data/information used to control (and detect faults in) an automated lighting system may include one or more of:

energy data/information—e.g. electrical energy, electrical power, electrical voltage, electrical current, electrical power quality, energy price/cost;

light level data/information—e.g. luminance, irradiance;

occupancy detection data/information—e.g. occupancy, movement;

status data/information—e.g. light enabled, relay open, breaker/contactor closed; and totalisation data/information—e.g. lamp running time.

Figure 2:
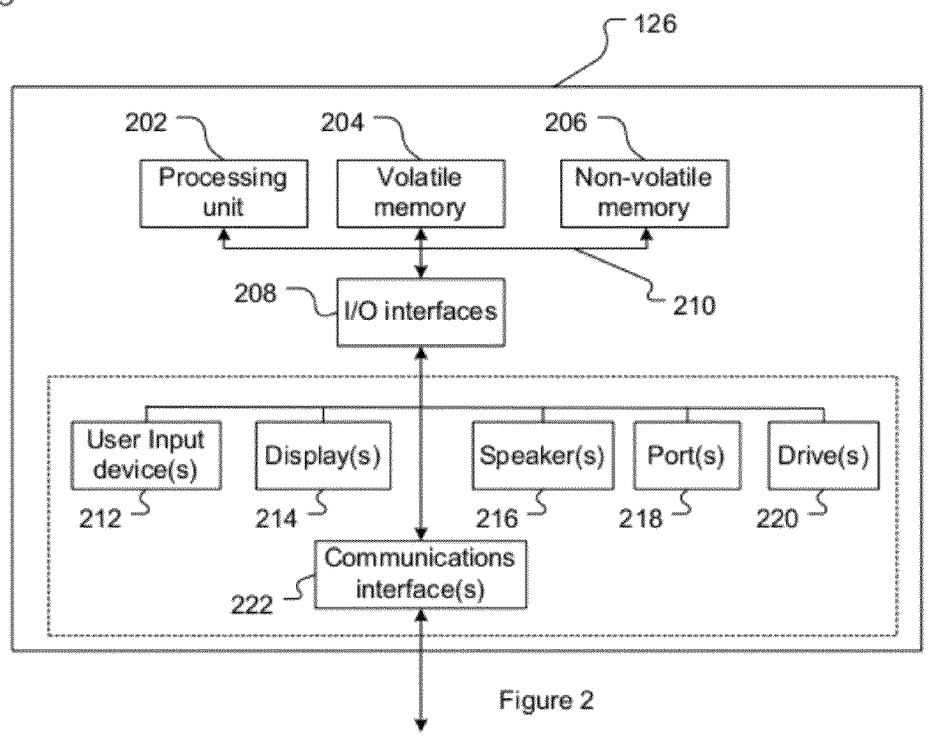
FIG. 2 is a block diagram of a computing device suitable for use with the present invention.

FIG. 2 provides a block diagram of a computing system suitable for use with the present invention. To continue with the HVAC system example, the computing system will be referred to as computing system 126 from HVAC system 100.

The computing system 126 includes at least one processing unit 202. The processing unit may include a single processing device (e.g. a microprocessor or other computational device), or may include a plurality of processing devices. Additionally, the processing unit may include local processing devices only, or may include distributed processing devices accessible and useable (either in a shared or dedicated manner) by the computing system 126.

Through a communications bus 210 the processing unit 202 is in data communication with volatile memory 204 (e.g. random access memory including one or more DRAM modules) and non-volatile memory 206 (e.g. one or more hard disk drives, solid state disk drives, and/or ROM devices such as one or more EPROMs). Instructions and data to control operation of the processing unit 202 are stored on the volatile and/or non-volatile memory 204 and 206.

The computing system 126 also includes one or more input/output interfaces 208 which interface with input/output devices. As will be appreciated, a wide variety of input/output devices may be used, including intelligent input/output devices having their own memory and/or processing units. In this instance the computing system 126 includes (by way of non-limiting example): one or more user input devices 212 (e.g. a keyboard, mouse, touch-screen etc); one or more display devices 214 (e.g. a monitor/video display unit); one or more audio devices (e.g. speakers) 216; one or more ports 218 for interfacing with additional devices (e.g. USB ports, Firewire ports, eSata ports, serial ports, parallel ports, SD card port, Compact Flash port, etc); one or more drives 220 (e.g. compact disc drives, DVD drives, Blue-Ray drives); and a communications interface 222 (e.g. a Network Interface Card allowing for wired or wireless connection to a network, such as public network (e.g. the Internet) or a private network).

Communications with a network (and other devices connected to that network) will typically be by the protocols set out in the layers of the OSI model of computer networking. For example, applications/software programs being executed by the processor 202 may communicate using one or more transport protocols, e.g. the Transmission Control Protocol (TCP, defined in RFC 793) or the User Datagram Protocol (UDP, defined in RFC 768).

The computing system 126 may communicate with (i.e. control and/or receive feedback) the various components of the multi-variable system via the input interfaces (such as ports 218 or other input interfaces/devices) and/the or communications interface (using wired or wireless means). In the HVAC system of the present example, the computing system 126 will control and/or receive feedback from components such as: the hydronic heater 104 (and any other heating components such as electric heating elements and gas turbines); the hydronic chiller 106; pumps in the pump system 108; valves in the valve system 110; fans in the fan system 118; dampers in the damper system 120; and sensors in the sensor system 122. As noted, the system may also communicate with additional sources of data/information, such as further building or external sensors and/or network accessible devices providing information of relevance (e.g. information from the webpages of a meteorological monitoring service/body).

High Level Overview of Fault Detection/Diagnosis Process

Figure 3A:
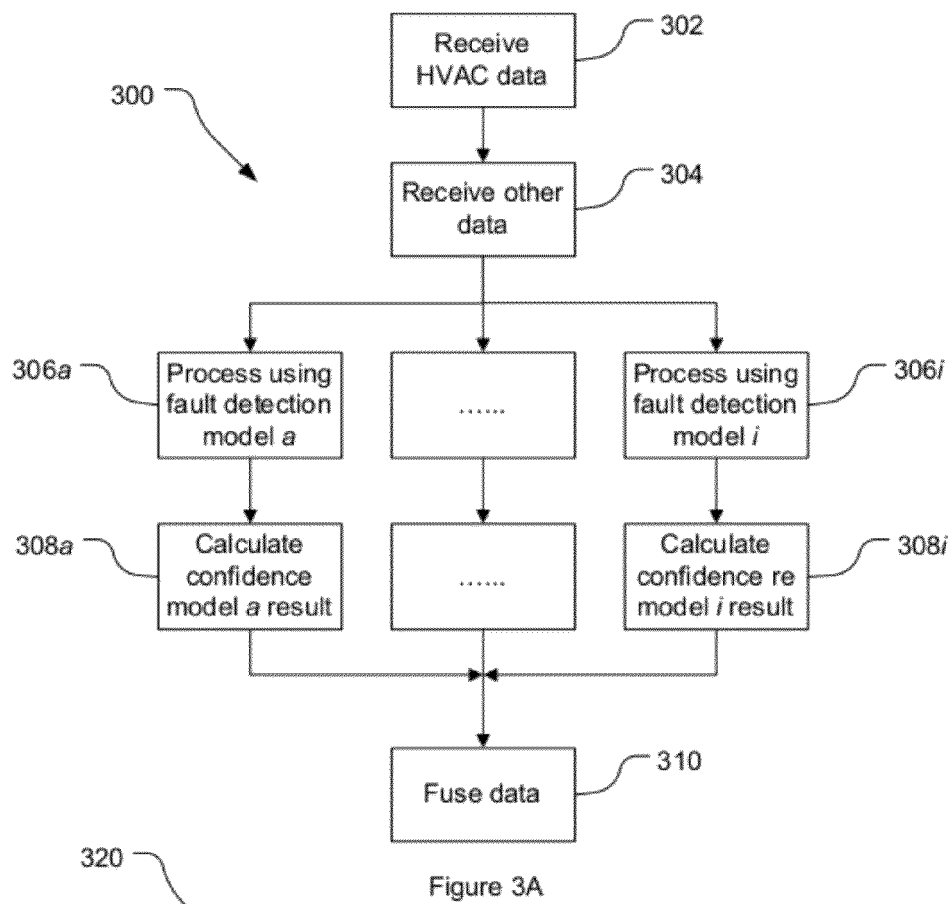
FIG. 3A is a flowchart depicting the high level steps in a process for detecting and diagnosing faults in a multi-variable system in accordance with an embodiment of the invention.

By way of overview, FIG. 3A provides a flowchart 300 illustrating the high-level processes involved in a fault detection/diagnosis process according to an embodiment of the invention. The fault detection/diagnosis process will typically be performed by a computer system such as that described above. In the HVAC system example this system may be (or form part of) the HVAC control system 124, or may be a stand alone system which has access to the relevant data/information. The present invention may be embodied in computer software programs/applications which include computer-readable instructions executable by processing units (such as unit 202). The instructions may be stored on a memory of a computing device, a portable computer readable medium (e.g. a disc or a flash drive or suchlike), and/or conveyed to the computing system by means of a data signal in a transmission channel. Examples of such transmission channels include wired or wireless network connections enabled by a communications interface (such as interface 222) and various communications protocols.

At step 302 data from the components of the multi-variable system is received. As described above, this data may, for example, include sensed data from various sensors within the system and feedback data from various components of the system.

At step 304, additional data from external data sources is received. As noted above, such additional data may include data from additional sensors and/or other sources such as the Internet.

It will be appreciated that while step 302 is depicted as occurring before step 304, the order of these steps may be changed, or, in fact, these steps may occur concurrently. Further, and depending on the multi-variable system in question, it may be the case that only data from the components of the system itself (i.e. the data received in step 302) is necessary to perform fault detection.

At steps 306a to 306i, the data received at steps 302 and 304 is processed in accordance with at least one specific fault detection models. The specific fault detection models are each based on a general type of fault detection process. In a preferred embodiment of the invention the general fault detection processes are dynamic machine-learning based processes (dynamic referring to the fact that the processes take into account changes over time in the system being modelled/analysed).

Two dynamic machine learning processes, Dynamic Bayesian Networks (DBNs) and Hidden Markov Models (HMMs), are discussed below.

As discussed below, developing specific fault detection models from these general processes involves mapping the multi-variable system and then training the model to learn patterns of either normal or faulty operation. These patterns of operation may be of the multi-variable system as a whole, or of more specific components/sets of components of the multi-variable system. Once trained, the correspondence with/deviations from the learnt patterns of operation of the system/component(s) thereof can be used to detect and/or diagnose faults. Where a model is trained on normal operation of the system/component(s), a deviation can be identified as a fault in the system or relevant component(s). Conversely, where a model is trained on faulty operation of the system/component(s), correspondence with the learnt model can indicate faulty operation of that system/component(s). Applying machine-learning based techniques to fault detection is advantageous in that such techniques do not rely on fixed rules or models to determine a fault.

The specific fault detection models 306a to 306i may include: models for detecting generally abnormal/faulty operation of the multi-variable system; models for detecting generally normal operation of the multi-variable system; models for detecting generally abnormal/faulty operation of a specific component or set of components of the multi-variable system; models for detecting generally normal operation of a specific component/set of components of the multi-variable system; or a combination thereof. As discussed below, the way in which the multi-variable system is modelled (using the general fault detection processes) and/or are trained will determine the nature of the specific fault detection models employed at steps 306a to 306i, and whether they detect faulty or normal operation in general or the existence of one or more specific faults. As such, and for example, specific fault detection models employed at step 306 may include:

- multiple instances of the same general type of fault detection process (e.g. DBN based techniques) with each specific instance being trained to detect normal or faulty operation of different system components/sets of system components;
- different general types of fault detection processes (e.g. DBN based processes, HMM based processes, support vector machine based processes, Kalman filter based processes) trained to detect normal or faulty operation of the same components/sets of system components;
- different general types of fault detection processes trained to detect normal or faulty operation of different system components/sets of system components; or
- a combination thereof.

The phrase "general type" of fault detection process as used herein is intended to refer to the general theory used to develop the specific fault detection models used to detect faults in step 306. For example, two general types of fault detection processes are discussed below—DBN based processes, and HMM based processes. Each general type of fault detection process may be used to create multiple specific fault detection models. For example, by training a general DBN based fault detection process on two different datasets, two specific fault detection models may be provided (both being DBN based models). Similarly, using two different system models in DBN based fault detection process may provide two different specific fault detection models (again, both DBN based).

If a model provides a fault detection result that is identified by a systems expert (such as a building operator) to be false (i.e. a false alarm), or that is contradictory with another fault detection result (for example both 'fault' and 'normality' detection models are triggered for an overlapping subset of variables), then this information can be used to improve the performance of future runs of the relevant fault detection model (or models). This is achieved by incorporating the feedback information into the next training run of the relevant model(s) as either 'normal' or 'fault' data depending on the identification, meaning similar states in future tests will have an improved likelihood of matching and thus won't be flagged erroneously.

This feedback information can also be used to help improve stopping criteria if testing against a model is repeated a number of times and clustering is performed (as described below).

Steps 306a to 306i may be performed concurrently (on multiple processors), or sequentially in any order desired.

Depending on the implementation in question, the fault detection/diagnosis process may conclude at step 306, with one or more faults (or normal operation) being diagnosed from the processing of the operational data against the fault detection models. In this case the diagnosis occurs according to which of the fault detection models is triggered by the operational data.

At steps 308a to 308i, and if desired, confidence levels of the outputs of the fault detection models 306a to 306i are calculated. In the embodiment described these calculations are performed using Dempster-Shafer theory.

At step 310 the faults detected in steps 306a to 306i, along with their corresponding levels of confidence, are fused together to provide a combined output (being either the presence of a fault or otherwise) and a level of confidence associated with that output. Once again, the described embodiment uses Dempster-Shafer theory for this fusion process.

While the fault detection/diagnosis process 300 has been depicted as a single process it will be appreciated that the process 300 is continuous, in that system and other data may be continuously (or, at least, periodically) received and processed.

Figure 3B:
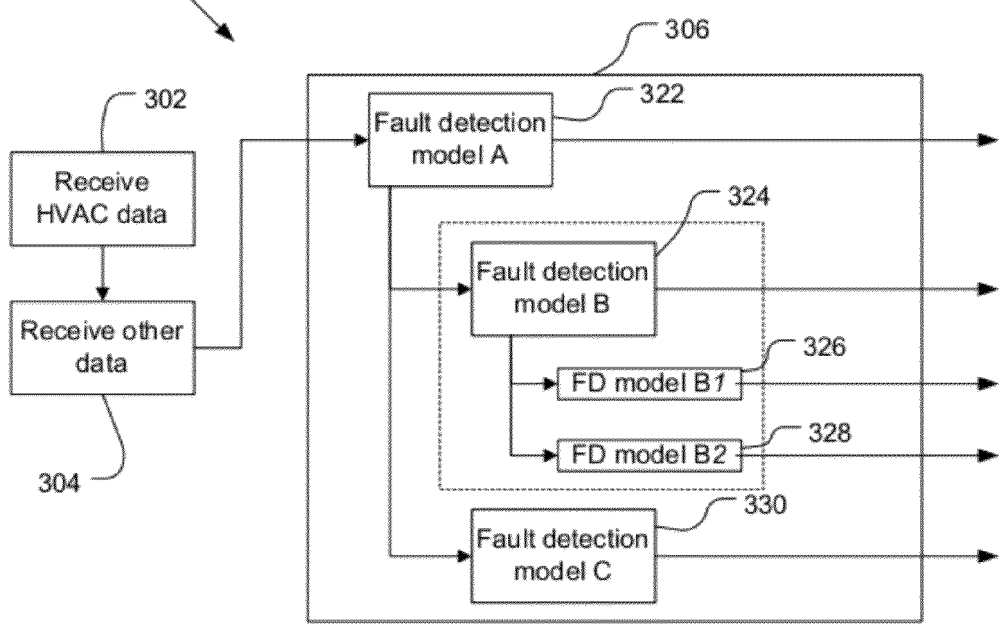
FIG. 3B is a flowchart depicting high level steps in a hierarchical process of detecting and diagnosing faults in accordance with an alternative embodiment of the invention.

Turning to FIG. 3B, a fault detection and diagnosis process 320 in accordance with an alternative embodiment of the invention will be described. Process 320 is similar to process 300 (described above), however the individual fault detection models 306 are hierarchically arranged to assist in fault diagnosis and in enhancing processing efficiencies.

As noted above, live/operational data may be tested against multiple (and different) fault detection processes/models. This allows for fault diagnosis (in addition to fault detection) to be performed at this stage.

Fault detection process 320 allows for data relating to the operation of the multi-variable system is processed in accordance with a hierarchy of fault detection models 306. These are depicted as:

- a general or high level fault detection model A 322 (the top of the hierarchy in this example) which is modelled and trained on data representative of normal operation of a high level set of components {A} of the multi-variable system (e.g. so as to detect normal/abnormal operation of that high level set of components);
- a more specific fault detection model B 324 (being a child of model A) which is modelled/trained on data representative of faulty operation of a set of components B of the multi variable system;
- a still more specific fault detection model B1 326 (being a child of model B) which is modelled/trained on data representative of faulty operation of component(s) B1 of the multi variable system (component(s) B1 being a component/s in the set of components B or a component/s related to the set of components B);
- a fault detection model B2 328 (being a child of model B) which is modelled/trained on data representative of faulty operation of component(s) B2 of the multi variable system (component/s B2 being a component/subset of components from the set of components B, or a component/s related to the set of components B); and
- a fault detection model C 330 (being a child of model A) which is modelled/trained on data representative of faulty operation of component(s) C of the multi variable system.

Initially, the live/operational data is processed according to fault detection model A. If this process indicates that the system is operating normally, further processing in accordance with models B and C may be omitted (and a "no fault detected" or similar result returned).

If, however, processing against model A shows the system to be operating abnormally, this abnormal operation can be reported and further processing performed in accordance with models B and C in order to try and more precisely diagnose the nature/cause of the abnormal operation.

If processing according to model B does not indicate a fault, further processing according to models B1 and B2 may be omitted. This would be reported/interpreted as an indication that the fault detected from model A is not caused by/present in components B.

Alternatively, if processing according to model B does indicate a fault, further processing in accordance with models B1 and B2 may be performed to try and diagnose that fault as being in the component/set of components B1 or B2.

Similarly, processing according to model C will indicate whether the fault identified from model A is likely or unlikely to stem from component(s) C.

Once processing the live data according to the models in the hierarchy has been completed, any fault may be diagnosed simply in accordance with which fault detection models were and were not triggered (and the degree of fit between the live data and the relevant models). Alternatively (or additionally) the output of the fault detection models may be further processed according to the data fusion techniques discussed below.

As will be appreciated, process 320 may be extended to a larger and more complete hierarchy of fault detection models/processes, with the specific models selected and arranged according to the multi-variable system in question. The top nodes/models of the hierarchy would generally be high-level fault detection processes using large sets of variables and, accordingly, triggered by a broad range of abnormalities in the system.

Progressing down the hierarchy increasingly more specific fault detection processes would be provided (using data from increasingly smaller sets of variables). This allows subsets of the fault detection processes available to be analysed in order to diagnose a detected fault. Where a subtree of fault detection processes in the hierarchy is triggered, the information of which of the processes were triggered can be used to give a good indication as to the likely cause of the fault.

While it would, of course, be possible to always process the live data against all models in the hierarchy, doing so may be impractical due to time/processing restrictions. By providing the models in a hierarchy, however, it is possible to avoid undue processing by only running those models which appear to be potentially relevant to an identified fault. This can be seen in the above example where the live data need only be processed according to models B1 and B2 if the parent model (B) indicates a likely fault.

Returning to the specific HVAC example, the "top" of the hierarchy of fault detection processes may be a fault detection process intended to show normal or abnormal operation of the system as a whole. If processing the operational/live data against this process indicates abnormal operation, operational data can then be processed in accordance with the next level of the hierarchy. This may include (for example), a fault detection process for detecting generally abnormal operation of the valve system and a fault detection process for detecting generally abnormal operation of the pump system. In this way the hierarchy can be traversed until the lowest level is reached and the most specific result provided for by the available fault detection processes arrived at.

Preliminary Fault Detection and Diagnosis

As noted above, at step 306 the data/information available (and relevant) is processed according to a plurality of specific fault detection models. Each specific model may be trained to detect generally whether the system appears to be operating normally or not, or may be trained for the detection of more specific faults.

The plurality of specific fault detection processes performed at step 306 (based on the specific fault detection models) may use multiple models which utilise the same general fault detection process. This may, for example, be where the general type fault detection process is trained on different datasets (i.e. trained to detect different types of faults) or has been used to model the multi-variable system in different ways (e.g. by modelling different combinations, permutations, or subsets of the variables/operational data of the system). The plurality of specific fault detection models may also (or alternatively) include models derived from different general fault detection processes. Employing multiple fault detection techniques and fusing the consequent data provides a valuable tool for the evaluation of risk and reliability in engineering applications where it is not possible to obtain precise measurement from experiments, or where knowledge is obtained from expert elicitation.

Two general dynamic machine-learning based fault detection processes are described in detail below: a fault detection process based on Dynamic Bayesian Network (DBN) theory, and a fault detection process based on Hidden Markov Method (HMM) theory. Both the DBN and HMM processes are statistical machine learning techniques and as such (in their own right) serve to avoid some of the limitations of the rule and model based fault detection techniques commonly used in detecting faults in multi-variable systems.

Figure 10:
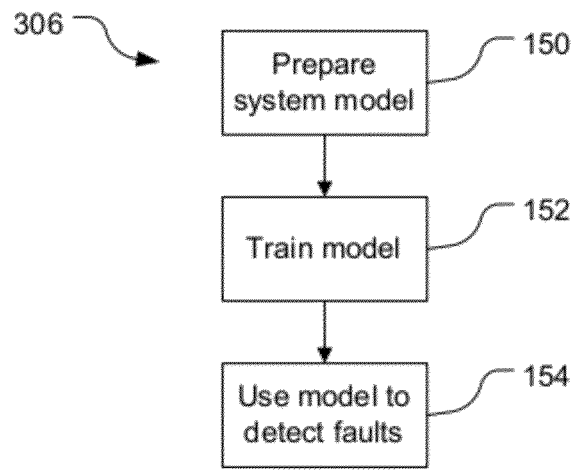
FIG. 10 is a flowchart depicting the high level steps in a specific fault detection/diagnosis process in accordance with an embodiment of the invention.

By way of very general overview, and with reference to FIG. 10, a specific fault detection model 306 (based on a dynamic machine-learning technique such as a DBN or HMM process) can be generated and used as follows. (These general steps are discussed in detail below.)

At step 150 a model/network of the multi-variable system is prepared. This will typically involve selecting variables/nodes of potential interest from the system (e.g. operational parameters derived from the system components/sensors), the relationships/links between those variables/nodes (where one variable is thought to have an effect on another variable), and initial probabilities relevant to the variables/links.

The variables/nodes used in a model represent operational parameters derived from the various components of the system. The variables, therefore, may include real-time information as to the operational state of a given component and/or information as to the configuration of a particular component (e.g. a setpoint or similar). For example, in the HVAC example variables/nodes (also referred to as operation points) may include any or all of the data/information that the control system uses in controlling the HVAC system 100. The relationships/links between the variables/nodes are provided where one variable is thought to have an effect on another variable, and initial probabilities relevant to the variables/ links The specific variables and links selected in step 150, and hence the model developed, will depend on the intended use of the specific fault detection model. For example, the variables/links in a model intended to detect faulty (or normal) operation of one particular system component may be different to the variables/links selected to detect faulty (or normal) operation of an alternative component or of the system in general.

As dynamic machine-based learning techniques are used, the links will typically include both intra- and inter-slice links. Intra-slice links are between two variables in the same time slice (i.e. at the same time), and represents the relationship between those variables in that time slice. Inter-slice links are between two variables in different time slices (i.e. time=t and time=t−1) and represent the relationship/influence that the particular variable at time t−1 has on the linked variable at time t.

In step 152 the model developed in step 150 is trained. This is achieved by applying a training dataset (data from operation of the system being modelled) to the model developed in step 150. The specifics of the training dataset will, again, depend on the intended use of the specific fault detection process in question. For example, the training dataset may include data representative of normal operation of the system, data representative of generally abnormal operation of the system, or data representative of abnormal operation of a specific component or subset of components of the system.

Once the fault detection model has been trained, it can be used to detect faults in the system (step 154). To detect faults, data relating to the operation of the system is processed in light of the trained model, and the operation of the system at the given time is compared to the operation of the system in the training period. Depending on the type of model being used, similarity or differences between the trained model and the operational model may be interpreted as a fault.

By way of example, if a fault detection model has been trained on data representative of normal (i.e. non-faulty) operation of the system as a whole, then an operational model that is similar to the trained model will be indicative of generally normal operation of the system, and an operational model that is different to the trained model will be indicative of generally faulty operation of the system.

Alternatively, if a fault detection model has been trained on data representative of faulty operation of a specific component or group of components of the system, then an operational model that is similar to that trained model will indicate faulty operation of the component/group of components with respect to which the model was trained.

As will be appreciated, a particular model can be adapted (i.e. the variables and/or links changed) over time. Similarly, a model can be re-trained using different and/or additional training data as desired.

Dynamic Bayesian Network (DBN) Fault Detection Process

A Bayesian network can be thought of as a graphical model that encodes probabilistic relationships among variables of interest. When used in conjunction with statistical techniques, the graphical model of a Bayesian network has several advantages for data analysis.

Because a Bayesian network encodes dependencies among all variables, it readily handles situations where some data entries are missing. This is a relatively common occurrence in multi-variable systems. For example, in HVAC/building management systems, missing data may be caused by storage capacity being reached, power failures or communications errors, non-periodic data being logged, incorrectly configured logging/trending by an operator, data corruption or deletion, or pre-filtering of data for other purposes. Additionally, a Bayesian network can be used to learn causal relationships between variables, and hence can be used to gain an understanding about a problem domain and predict the consequences of intervention. Further, because the Bayesian network model includes both causal and probabilistic semantics, it is a suitable representation for combining prior knowledge (which often comes in causal form) and data. Further still, Bayesian statistical methods in conjunction with Bayesian networks offer an efficient and principled approach for avoiding the over fitting of data.

Figure 11:
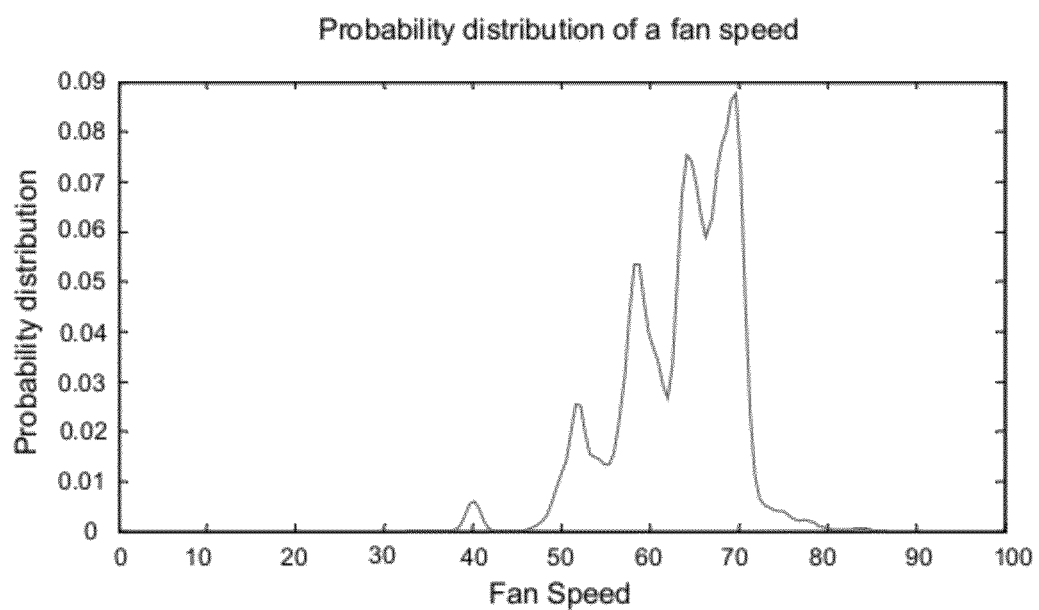
FIG. 11 is a graph based on statistical measurement showing an example probability distribution of a fan in a HVAC system.

Each variable in a Bayesian network has a probability distribution which describes the probability of the variable having a particular value (out of the possible values for the variable). For example, in a HVAC system one variable may be the speed of a particular fan, and the probability distribution for that fan may be as shown in the graph provided in FIG. 11, produced by statistical measurement.

The Bayesian network also includes probabilistic links (arcs) between variables. These links are conditional probability distributions which describe the probability distribution of the target variable (i.e. the variable at which the link terminates) when the variable from which the link originates has a particular value. For example, and as discussed further below, in a HVAC system there may be a relationship (and hence a link) between a fan power variable and the fan speed variable. The conditional probability distribution associated with this link would be:

$$p_{Fan\ speed}(\text{fan speed value}|\text{fan power value})$$

A standard Bayesian network is non-dynamic, which can be disadvantageous in multi-variable system fault detection/diagnosis applications. For example, non-dynamic approaches such as standard Bayesian networks have limited network structures and cannot represent the direct mechanism of temporal dependencies among variables.

To cater for the dynamic nature of multi-variable systems (such as HVAC systems), which are typically temporally dependent, an additional dimension of time is added to a standard Bayesian network to generate a Dynamic Bayesian Network (DBN). A DBN is an extension to a Bayesian network that represents a probability model that changes with time. For the purposes of fault detection in multi-variable systems, DBNs offer a number of further improvements over standard Bayesian networks—such as relaxing some of the feedback restrictions typical of the standard directed acyclic graphs used for Bayesian networks. Accordingly, for modelling time-series data the use of directed graphical models, which can capture the fact that time flows forward, is advantageous as they enable the multi-variable system to be monitored and updated as time proceeds, and to use both current and previous system behaviour to predict future behaviour of the system.

In a DBN, a probabilistic network is used to represent the joint probability distribution of a set of random variables. The variables of the DBN can be denoted as the states of a DBN because they include a temporal dimension. The states satisfy the Markov condition that the state of a DBN at time t depends only on its immediate past (i.e. its state at time t−1). As with a standard Bayesian network, a DBN uses nodes to represent variables in the system and links between the nodes to represent probabilistic relationships/dependencies between nodes (variables). In a DBN, however, links can be both between nodes in the same time-slice (intra-slice links) or between nodes in different time-slices (inter-slice links). Intra-slice links are condition probabilities between variables within the same time-slice. Inter-slice connections represent condition probabilities between variables from different time-slices. As such, each state of the dynamic model at a given time-slice t may depend both on the state of one or more nodes of the model at a previous time-slice (e.g. time t−1), and the state of one or more nodes in the given time-slice t.

Defining a DBN requires three sets of parameters to be defined:

1. The initial probability $P(x_o)$ which is the priori probability distribution at the initial state of the process;
2. The state transition probability $P(x_t|x_{t-1})$ which specifies time dependency between the states; and
3. The observation probability $P(y_t|x_t)$ which specifies the dependency of observation states regarding to the other variables at time-slice t.

Here x and y are the states of variables within the DBN.

Accordingly, in order to generate a DBN for a multi-variable system the following need to be defined: the set of variables in the network; the initial states of each of the variables; the a priori probabilities for each variable in the network and their conditional probability dependencies (CPDs) (determined based on training datasets); and the dependency relationships between the variables. Determining the dependency relationships involves creating both intra-slice links (each intra-slice link being between two variables within the same time-slice), and inter-slice links (each inter-slice link being between a variable in a previous time-slice and a variable in the current time-slice).

Figure 4:
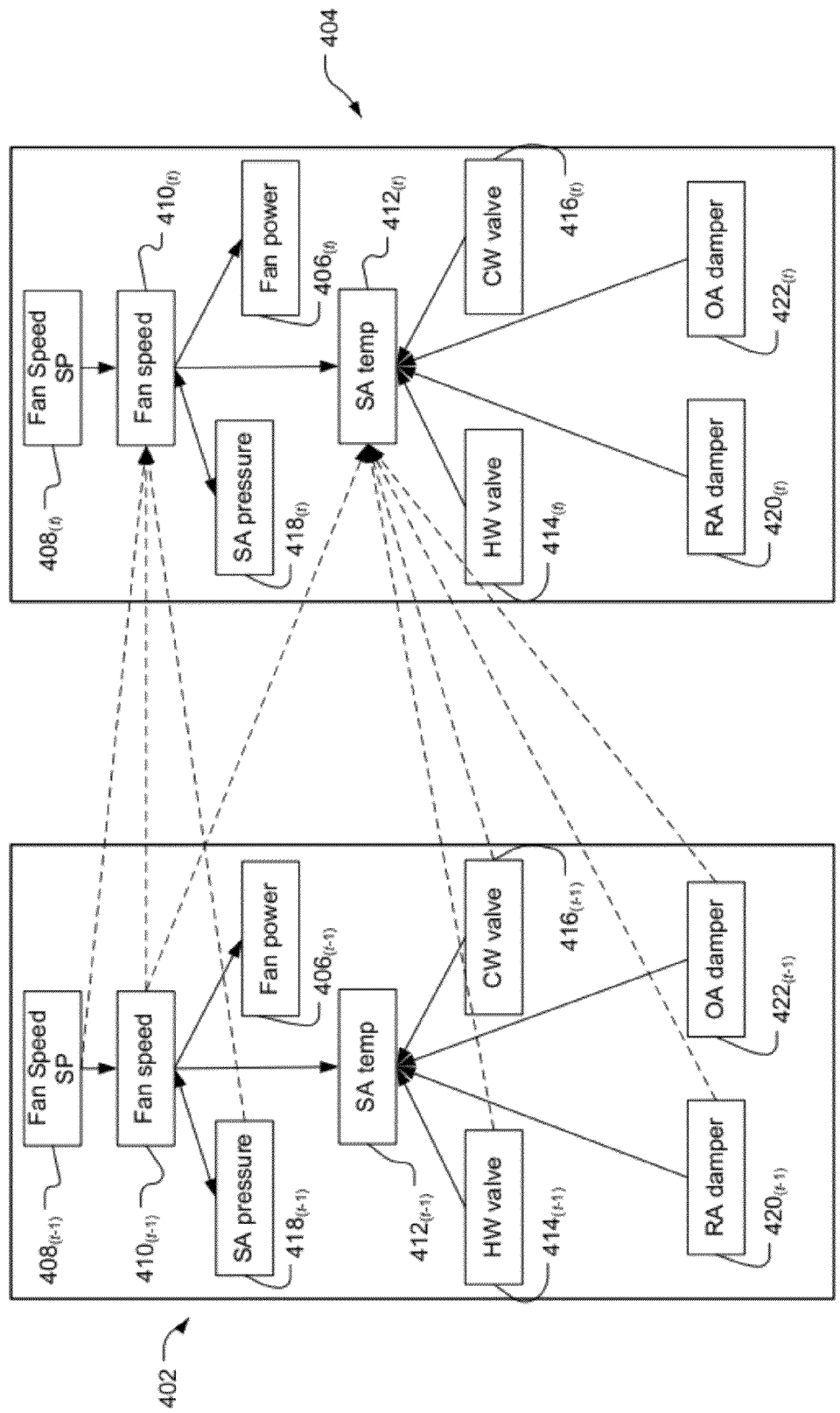
FIG. 4 depicts a DBN representative of a HVAC system.

Turning to the specific HVAC system example, FIG. 4 shows a DBN 400 designed for fault detection in a HVAC system. DBN 400 illustrates two time-slices 402 (time t−1) and 404 (time t). The nodes (variables) of DBN 400 are the various sensors and feedback mechanisms in the HVAC system. In this instance nine nodes are incorporated in the DBN: Fan Power 406, Fan Speed Set point 408, Fan Speed 410, Supply Air Temperature 412, Hot Water Valve 414, Chilled Water Valve 416, Supply Air Pressure 418, Return Air Damper Position 420, and Outside Air Damper Position 422. Additional variables from the data/information relevant to the HVAC system could, of course, also be included.

As can be seen, in each time-slice 402 and 404 solid lines are used to show the intra-slice links between nodes. For example, fan speed 410 is related to both the fan speed setpoint 408 and supply air pressure 418. Broken lines are used to show inter-slice links between nodes. For example, at time t the fan speed (410$_t$) is related, inter alia, to the fan speed setpoint t−1 (408$_{t-1}$), the fan speed at time t−1 (410$_{t-1}$), and the supply air pressure at time t−1 (418$_{t-1}$) (in addition to being related to the supply air pressure time t (418$_t$) and the fan speed setpoint at time t (408$_t$)). These dependency links/relationships are initially designed based on the understanding of the HVAC system and the experience of the building managers.

In experiments, all the nodes are continuous and all the CPDs are linear-Gaussian. As noted above, the DBN 400 can be defined as $\{P(x_o), P(x_t|x_{t-1}), P(Y_t|x_t)\}$. It is a two-slice temporal Bayesian network which defines $P(x_t|x_{t-1})$ by means of a directed acyclic graph (DAG) as follows:

$$P(x_t|x_{t-1}) = \Pi_{i=1}^{N} P(x_t^i|\pi(x_t^i)) \qquad \text{(Equation 1)}$$

Here $x^i$ stands for each node, and $x^t$ is a node at time-slice t. $\pi(x_t^i)$ denotes the set of parents of $x^i$ in the network, which can be at either time-slice t or t−1. The links joining the nodes in the first time-slice 402 of the DBN do not have parameters (i.e. conditional probability dependencies) associated with them, but each link joining nodes in the second time-slice 404 does has an associated CPD.

In the network, the first-order Markov assumption is satisfied. That is, the parents of a node are only in the same time-slice or the previous time-slice—i.e. all inter-slice links are from time t−1 (time-slice 402) to time t (time-slice 404). The direction of intra-slice links can be arbitrary. Once trained, the parameters of the CPDs associated with the variables do not change over time (unless the DBN is re-trained). The semantics of DBN can be defined by "unrolling" the network to T time-slices. Hence the resulting joint probability distribution is defined by:

$$P(X_{1:T}) = \Pi_{t=1}^{T} \Pi_{i=1}^{N} P(x_t^i|\pi(x_t^i)) \qquad \text{(Equation 2)}$$

As the structure of the DBN is pre-defined, the parameters that need to be learnt are the set of conditional probabilities in equations (1) and (2) that quantify the nodes of the network.

These parameters are estimated using the Maximum Likelihood (ML) algorithm, as described in Myung, I. J.: *Tutorial on maximum likelihood estimation*. Journal of Mathematical Psychology 47, 90-100 (1263). The ML estimator chooses values for the conditional probabilities that maximise the probability of the training dataset.

The measurements/data on which a given DBN fault detection model is trained will depend on the intended use of that fault detection model. For example, if the specific fault detection model is intended to detect generally abnormal operation of the multi-variable system, the DBN may be trained using measurements/data taken from the normal operation of the multi-variable system (i.e. the system operating without errors or faults). The network learns the CPD parameters of the system when it runs smoothly.

Alternatively, if the specific fault detection model is intended to detect faulty operation of a specific component or group of components, the DBN may be trained using measurements/data taken form operation of the multi-variable system with the component(s) in question operating abnormally.

The learnt network is then used to make inferences from testing datasets (as described below). Depending on the testing dataset, a DBN can be trained to generally detect abnormal behaviour, or can be trained to detect specific faults.

For fault detection, testing datasets provide observed values of the nodes in the network and allow the probability distributions to be calculated based on these observed values. The posterior probabilities can then be calculated to obtain the likelihood value of the dataset, which measures how well the testing dataset fits the DBN. When a fault occurs, the likelihood value should be lower than the value with normal datasets.

The output of a DBN fault detection process, therefore, is a likelihood that provides information as to how well a new measurement (e.g. current sensor/data readings) fits to the learnt model.

If the model is trained on normal operation of the system as a whole, and the new measurement has a good fit with this model well, then there is a likelihood that the new measurement also represents normal operation of the system. If the new measurement does not have a good fit with the trained model this may be indicative that the new measurement represents abnormal/faulty operation of the system.

Alternatively, if the model is trained on abnormal operation of a specific component/set of components, and the new measurement fits this model, then it is likely that the new measurement represents abnormal operation of that same component/set of components.

In this way, the selection and use of different models can be used to both detect and diagnose faults in the multi-variable system.

Tests of HVAC fault detection using Dynamic Bayesian Network

Returning again to the specific HVAC system example, and by way of illustration, the results of two real-world tests will be discussed.

HVAC System Fault Detection Using Dynamic Bayesian Network Experiment One

In the first test, a fault was generated by forcing a chilled water valve in a HVAC system to remain at 30% open (simulating a stuck valve). The DBN in respect of the system being tested was trained over a period of 8 weeks in which the HVAC system was running normally. Consequently, in use the DBN should be able to detect abnormal operations relevant to the nodes (variables) (as per FIG. 4). The DBN of this example was developed and trained using variables/system points known to be closely related to the air handling unit (AHU) subsystem, and the components thereof, of the HVAC system. This provided a fault detection model for use in detecting faults in the AHU subsystem generally, as well as faults in the chilled water valve component of that subsystem.

Graph 502 shows the dataset taken from 5 days of operation after the system was trained. The fault detection procedure then used datasets of from the operation of the HVAC system from five days after the system was trained. The chilled water valve in the HVAC system was set at 30% open from 11:50 am to 12:12 pm on day two of the testing, and reset to normal operation after 12:12 pm.

Figure 5A:
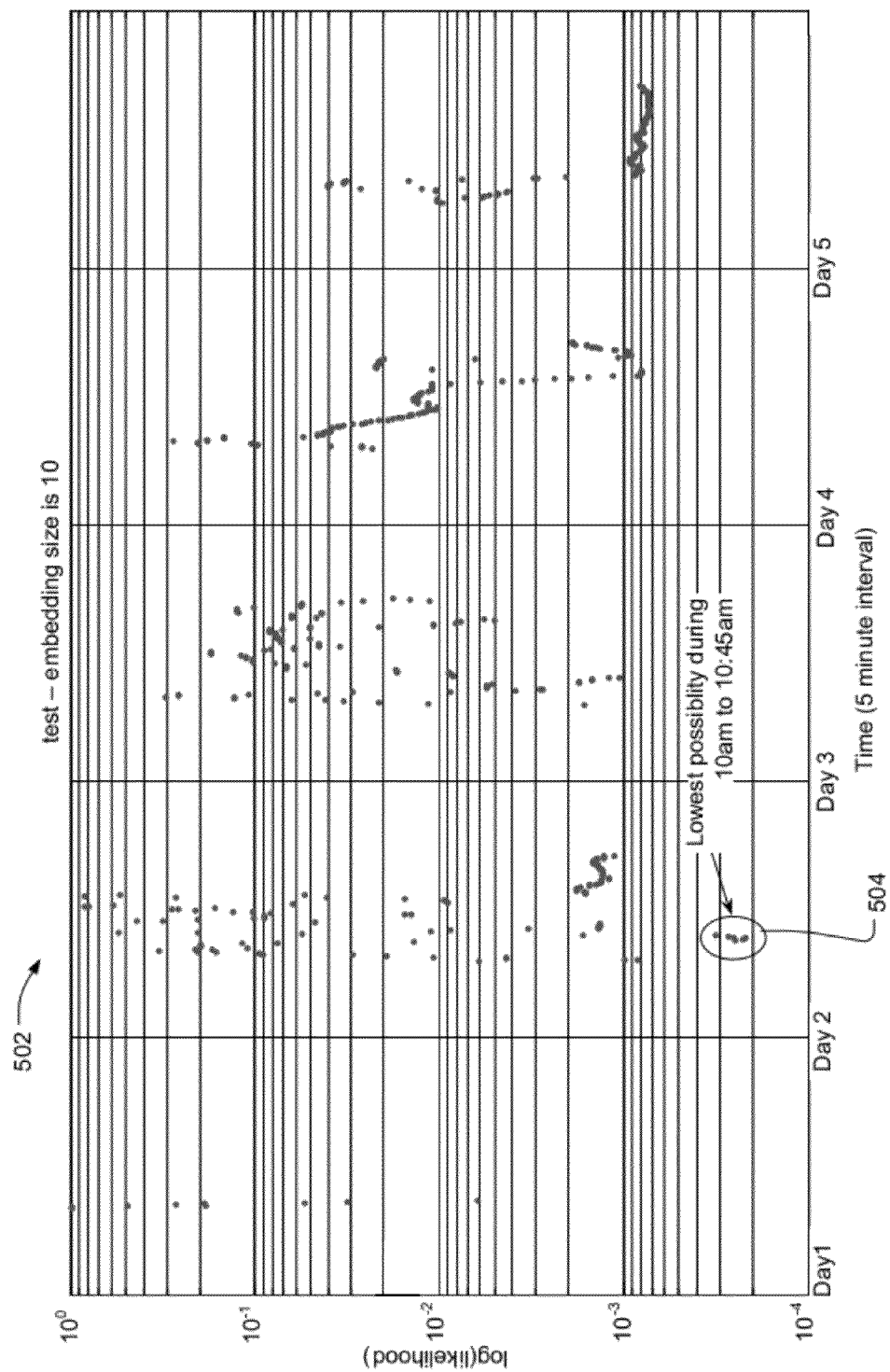
FIG. 5A shows test results from using a DBN fault detection process to detect a fault in a real-world HVAC system.

The results of this test are shown in graph 502 of FIG. 5A. The x-axis of graph 502 shows time and the y-axis is the log likelihood of the combined probability over the whole network—i.e. the probability distribution over U={X1, X2, ..., Xk} where X is the variable expressed by the node of the network—(with the lower the likelihood, the higher the likelihood that a fault is occurring). As can be seen, the lowest points of the log likelihood (504) are recorded during late morning on the second day of the test, matching the artificial fault introduced into the system.

HVAC System Fault Detection Using Dynamic Bayesian Network Experiment Two

In the second test, a fault was generated by forcing the output air damper to be stuck. The details of the experiment are described as follows:
- 14.54—air handling unit (AHU) in cooling mode, high humidity day, output air damper initially closed, output air damper locked at 50% open.
- 14.56—noticeable rise in chilled water valve position until 14.57. Flattens out at about 35%.
- 15.03—output air damper opened to 100%.
- 15.04—sharp rise in chilled water valve position. Flattens out at about 58%.
- 15.20—output air damper reset to auto control (drops to 0%-closed). Chilled water valve position drops back to normal levels by 15.22.

Figure 5B:
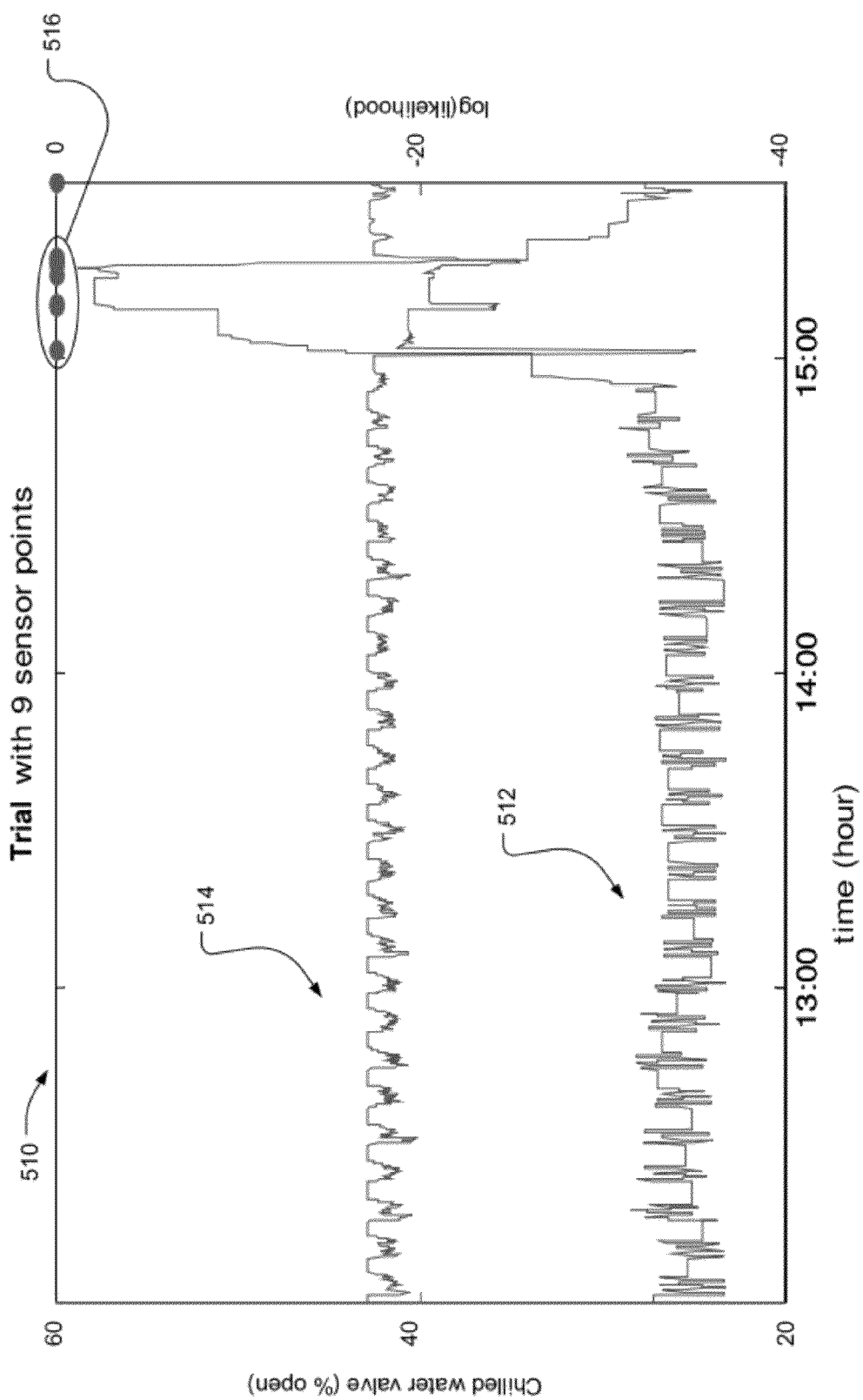
FIG. 5B shows test results from using a DBN fault detection process to detect an alternative fault in a real-world HVAC system.

In this experiment, nine sensors were used to build up a DBN, which was trained over the same 8 weeks of normal system operation in the previous experiment. The output air damper sensor was not used in the training and testing. The results of this test are shown in graph 510 FIG. 5B, with the x-axis being time. Line 512 of graph 510 shows the % opening of the chilled water valve (as shown on the left y-axis), and line 514 shows the log likelihood of the combined probability (as shown on the right y-axis). As can be seen, the testing results show a period marked as dots 512 in the afternoon (2:55 pm-3:25 pm) which match to the fault that was set in the experiment.

Hidden Markov Model (HMM) Fault Detection Process

A fault detection process using a Hidden Markov Model (HMM) will now be described. HMMs are suitable for modelling multi-variable systems as they are able to infer optimal hidden states from observational sensor data. Generally speaking, a HMM is a statistical model in which the system being modelled is assumed to be a Markov process with unknown parameters. A Markov process is a mathematical model for the random evolution of a memoryless system. That is, the likelihood of a given future state at any given moment depends only on its present state and not on any past states.

The most common HMM structure is a finite set of states, each of which is associated with a (generally multidimensional) probability distribution. Transitions among the states are governed by a set of probabilities called transition probabilities. In a particular state an outcome or observation can be generated according to the associated probability distribution. It is only the outcome, not the state, that is visible to an external observer and therefore the states are said to be "hidden".

To define a HMM, three basic components are needed:
1. A vector containing the prior probability of each hidden state: the initial state distribution, $\pi=\pi_i$, where $\pi_i=p\{q_0=i\}$, for $1 \leq i \leq N$. Here N is the number of states of the model, and $q_0$ denotes the initial state.
2. A set of state transition probabilities $A=a_{ij}$. Define $$a_{ij}p\{q_{t+1}=j|q_t=i\}, 1 \leq i,j \leq N, \quad \text{(Equation 3)}$$

where $q_t$ denotes the current state. Transition probabilities should satisfy the normal stochastic constraints, $$a_{ij} \geq 0 \text{ for } 1 \leq i, j \leq N, \text{ and } \sum_{j=1}^{N} a_{ij} = 1 \text{ for } 1 \leq i \leq N.$$

3. The probability of the observation given a state, $B=\{b_j(k)\}$. Define $$b_j(k)=p\{O_t=v_k|q_t=j\}, 1 \leq j \leq N, 1 \leq k \leq M, \quad \text{(Equation 4)}$$

where $v_k$ denotes the $k_{th}$ observation, M the number of observation, and $O_t$ the current parameter vector. Following stochastic constraints must be satisfied:

$$b_j \geq 0 \text{ for } 1 \leq j \leq N, 1 \leq k \leq M,$$

and $$\sum_{k=1}^{M} b_j(k) = 1 \text{ for } 1 \leq j \leq N.$$

In modelling multi-variable systems, transitions between the same or different behavioural states can be predicted using state transition matrix A (representing the transitions among the states are governed by a set of transition probabilities governing transitions among the states of the HMM) and state-dependent observation matrices B. The state transition matrix A and state-dependent observation matrices B are based on measurement of the multi-variable system during normal operation.

A HMM is a special case of a DBN in that the state space of a HMM consists of a single random variable, while a DBN represents the hidden state in terms of a set of random variables. As such, a HMM fault detection process for a multi-variable system can be more easily implemented than a DBN fault detection process as the HMM process does not require the structure of the model to be defined. The only pre-defined parameters of the HMM are the number of observation states and the number of hidden states. Generally speaking, the observations states are what can be measured. The hidden states may not have real-world/physical meaning, and are generally selected based on experience and/or experimentation.

Similar to the training process for the DBN discussed above, the HMM model can be trained using measurements from normal or abnormal operation of the multi-variable system as a whole, or of specific components/sets of components of the multi-variable system. The most likely set of state transitions and output probabilities are learned using training datasets obtained from this normal operation. The training process is used to find the HMM parameters that maximise the probability $P(v|(\pi, A, B))$, where O is the observation (i.e. data/information available from the system components and relevant additional sources), $\pi$ is the initial state distribution, A is the state transition matrix, and B is the state-dependent observation matrix relevant to the observation. This process is performed using the recursive Baum-Welch algorithm, as described in Rabiner, L. R. (1989). *A Tutorial on Hidden Markov Models and Selected Applications in Speech Recognition*. Proceedings of the IEEE, 77(2):257~286.

In the fault detection process, new data/information (e.g. sensor measurements and other component feedback) are input and based on this the HMM calculates the likelihood of the new measurement's fitness to the learnt HMM. If the likelihood is low, a potential fault is detected.

The output of the HMM fault detection process is similar to DBN, insofar as it indicates the fit between the current measurements and the learnt model.

Tests of HVAC Fault Detection Using Hidden Markov Model

Referring to the specific HVAC system example, and by way of illustration, the results of real-world tests of fault detection in a HVAC system using a HMM process will be discussed.

Figure 6:
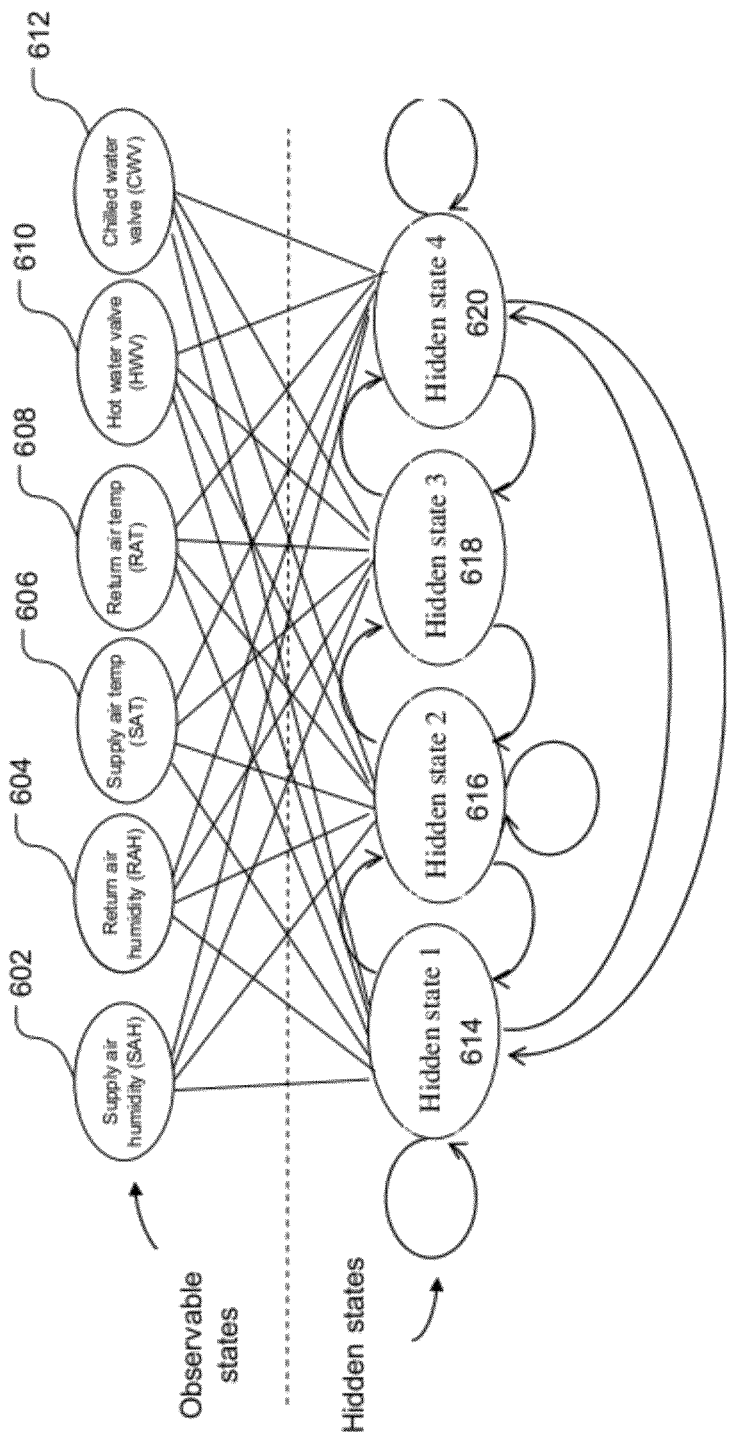
FIG. 6 depicts a HMM representative of a HAVC system.

FIG. 6 shows a HMM 600 in relation to the HVAC system that was used for the tests described. HMM 600 includes six observable states/variables (supply air humidity 602, return air humidity 604, supply air temperature 606, return air temperature 608, hot water valve value 610, and chilled water valve value 612) and four hidden states (hidden state one 614, hidden state two 616, hidden state three 618, and hidden state four 620). The links between the hidden states 614 to 620 represent the state transition probabilities (i.e. A). The links from each hidden state 614 to 616 to the observable states 602 to 612 represent the state-dependent observation matrix for that state (i.e. B).

The tests were conducted in a building which included three air handling units (AHU-1, AHU-2, AHU-3) servicing three adjacent HVAC zones, the zones consisting of 18 offices and associated corridors. The HMM was trained using data taken from normal operation of the HVAC system. Different tests were been performed for HVAC data with stuck Hot water valve faults from one of the air handling units AHU-2. The test data included data from different seasons (spring and summer) and from different fault durations (20 minutes to 3 hours).

Figure 12:
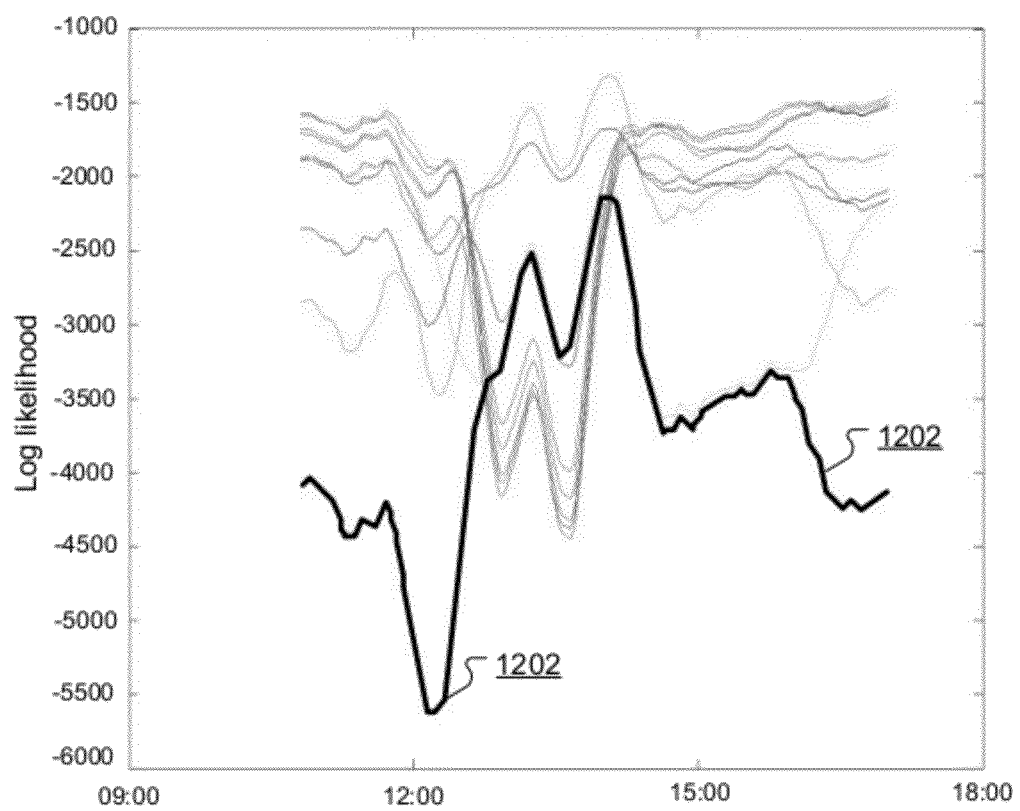
FIG. 12 is a graph showing a plurality of test results obtained using a Hidden Markov Model fault detection model, with one of the results not converging to the global minima.

Generally speaking, each training dataset is used to train several HMMs. Although each HMM is generated based on the same training dataset, the randomness of the starting states of the transfer matrix can result in different models being generated. Because of the differences between the learnt HMMs, the testing results (the log likelihood) can vary between tests and it can be difficult to detect a fault based on the log likelihood using a pre-defined threshold. Sometimes the testing results (the log likelihood) can even converge to local minima, especially when the training datasets are not big enough. FIG. 12 shows ten different testing results on ten different HMMs trained on the same training dataset In FIG. 12, line 1202 depicts one test result that does not converge to the global minima.

In order to increase reliability, the HMM training and testing processes can be repeated a number of times (N). K-Mean clustering (as described, for example, in Hartigan, J. A.; Wong, M. A. (1979). *"Algorithm AS 136: A K-Mean Clustering Algorithm"*. Journal of the Royal Statistical Society, Series C (Applied Statistics) 28 (1): 100-108) is then applied to the N tests in order to cluster the test results and identify faults. In such clustering, the relative distance (in log likelihood) from the other points is used as the cluster distance metric.

By way of example, for the fault detection in HVAC systems it is not know whether there will be any fault in the testing datasets ahead. To decide how many clusters within the datasets (how many types of faults), following distances are defined.

Firstly assuming the cluster number is M, K-Mean clustering is applied to find these M clusters. The distances between two clusters Ci and Cj are calculated as D(i, j). The radius of each cluster Ri is defined as the maximum distance between a point within the cluster Ci and the centre of the cluster. Three ratios are calculated as:

$$\gamma_1(i,j) = |(D(i,j) - R2)/R1| \quad \text{(Equation 5)}$$

$$\gamma_2(i, j) = |(D(i, j) - R1)/R2| \quad \text{(Equation 6)}$$

$$\gamma_3(i, j) = D(i, j)/R1 + R2 \quad \text{(Equation 7)}$$

When $\gamma_1(i,j)$, $\gamma_2(i,j)$, and $\gamma_3(i,j)$ are all less than 1, clusters Ci and Cj merge to the same cluster, and the new centre of this cluster is calculated. The process stops when these three ratios are larger than 1 between any two clusters. The final cluster number minus one is the number of the faults in the testing datasets, as one cluster is for the normal situation.

Two specific HVAC fault detection experiments using Hidden Markov Models are described below, with the training datasets being the same for both experiments and being based on operation of a HVAC system over two weeks in the month of December.

HVAC System Fault Detection Using Hidden Markov Model Experiment One

In the first experiment, the hot water valve was stuck three times in AHU-2. This occurred in the month of September. The details of this experiment were as follows:

1:33 pm—Locked hot water HW valve 5% (the existing value of HW valve is 0%, CHW valve is ~4%).
1:37 pm—Reset HW valve 25%.
1:48 pm—HW valve back to normal 0% (it's existing value), CHW valve at ~12%, and then automatically go back to its normal value ~4.xx % in about 36 minutes.
2:24 pm—Locked HW valve 25% (the existing value of HW valve is 0%, CHW valve is ~12%)
2:36 pm—HW valve is back to normal 0% (it's normal (existing) value), CHW value goes down from ~12% to its normal value ~4.58% much slower than last time, in about 40 minutes.
3:22 pm—Locked HW valve 40% (the existing value of HW valve is 0%, CHW valve is ~4.58%)
3:35 pm—HW valve is back to normal 0% (it's normal (existing) value), CHW value goes down from 26.77% to its normal value.

Figure 7A:
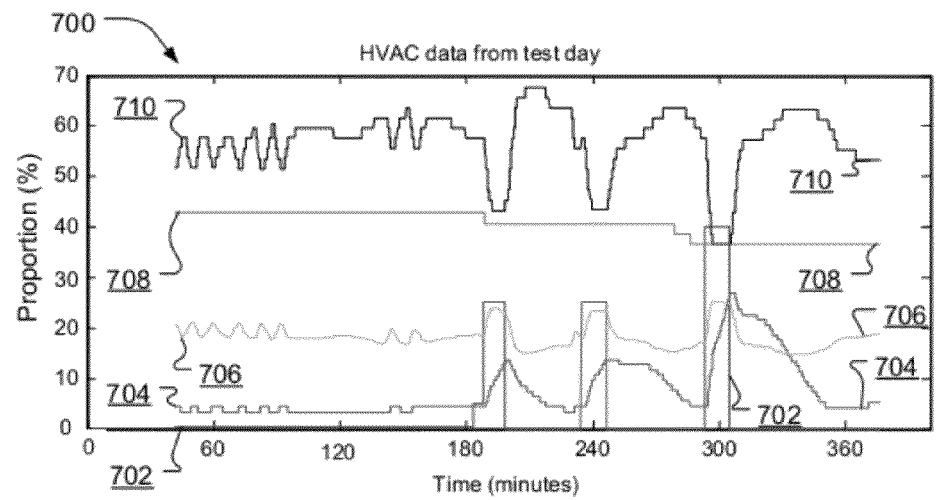
FIG. 7A is a graph showing sensor data from a HVAC system test using a HMM fault detection process.
Figure 7B:
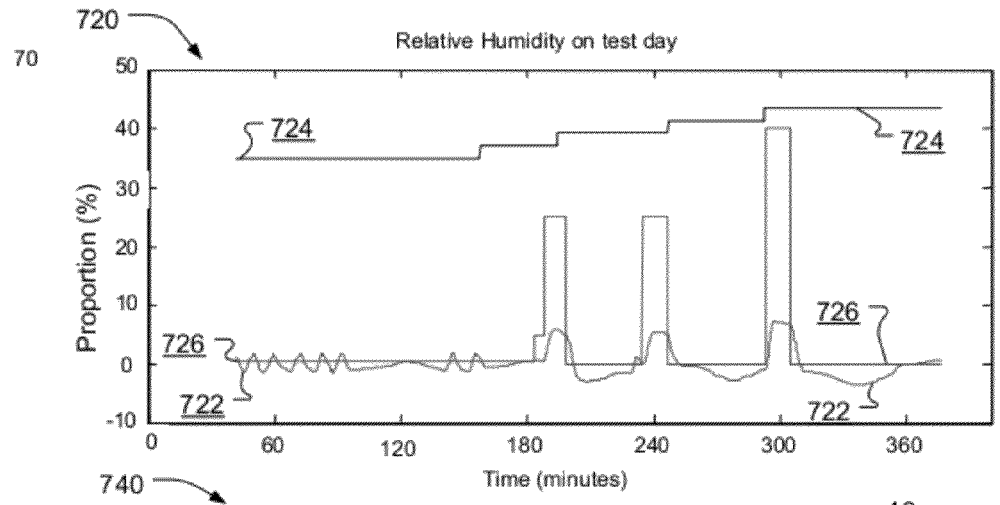
FIG. 7B is a graph showing further sensor data from the same test of FIG. 7A.

Graphs 700 and 720 of FIGS. 7A and 7B show the test data from this test. In graph 700 of FIG. 7A: line 702 plots the hot water valve (%); line 704 plots the chilled water valve (%); line 706 plots the supply air temperature (° C.); line 708 plots the supply air relative humidity (%); and line 710 plots the return air relative humidity (%). In graph 720 of FIG. 7B: line 722 plots the supply air temperature difference with its set points (° C.); line 724 plots fan speed (%); and line 726 plots the hot water valve (%).

Figure 7C:
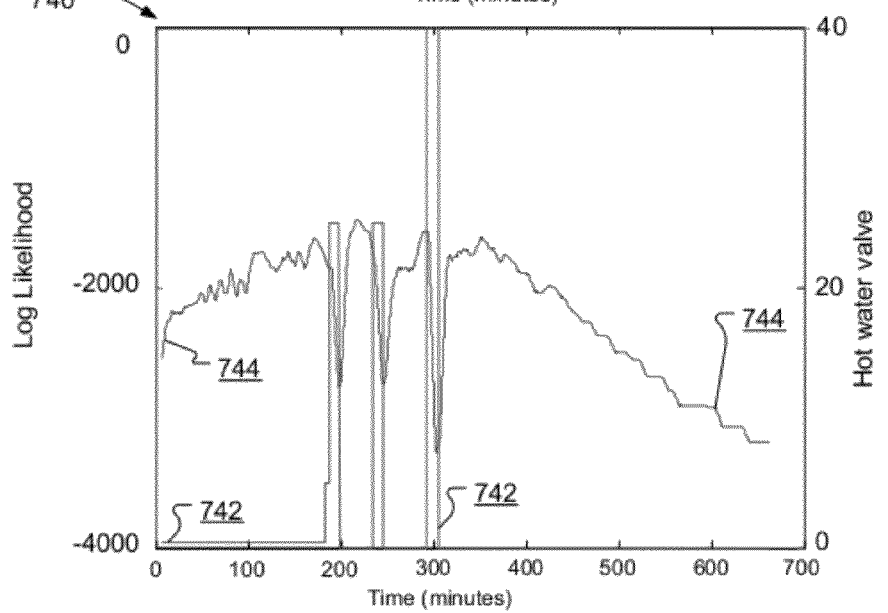
FIG. 7C is a graph showing the status of the hot water valve as the ground truth and the HMM log likelihood based on the data depicted in FIGS. 7A and 7B.

Graph 740 of FIG. 7C shows the HMM log likelihood based on the test data of FIGS. 7A and 7B. Line 742 of graph 740 plots the status of the hot water valve (%) as the ground truth, and line 744 plots the log likelihood.

Figure 7D:
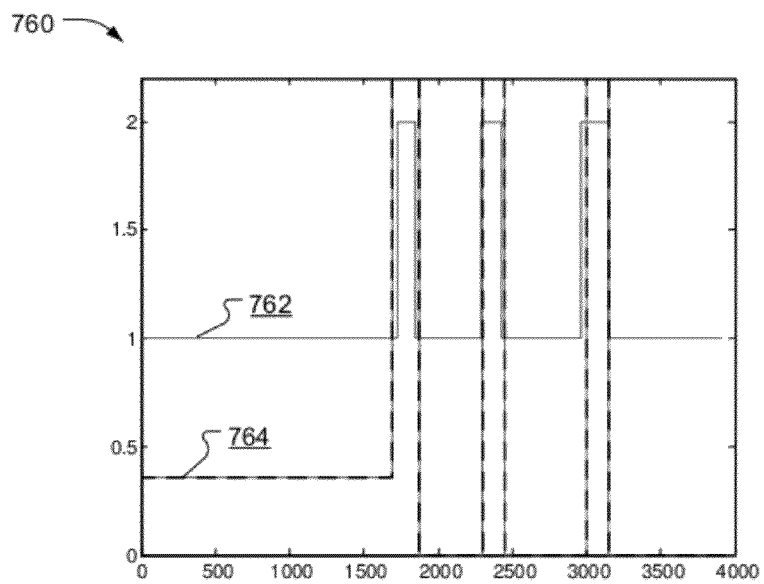
FIG. 7D is a graph showing fault detection data after using a K-Mean classifier to detect faults in the log HMM likelihood data of FIG. 7C.

Graph 760 of FIG. 7D shows the fault detection results after using a K-Mean classifier on the log likelihood data of FIG. 7C. Solid line 762 of graph 760 plots the ground truth, and broken line 764 marks the identified faults.

As can be seen, the broken line 764 in graph 760 identifies three "faults" which correspond to the locking of the hot water valve described in above.

HVAC System Fault Detection Using Hidden Markov Model Experiment Two

In the second experiment, the hot water valve in AHU-2 was stuck for a longer period. The details of this experiment are as follows:

11:14 am—HW valve locked at 40%.
2:20 pm—HW Valve returned to BMS control.

Figure 8A:
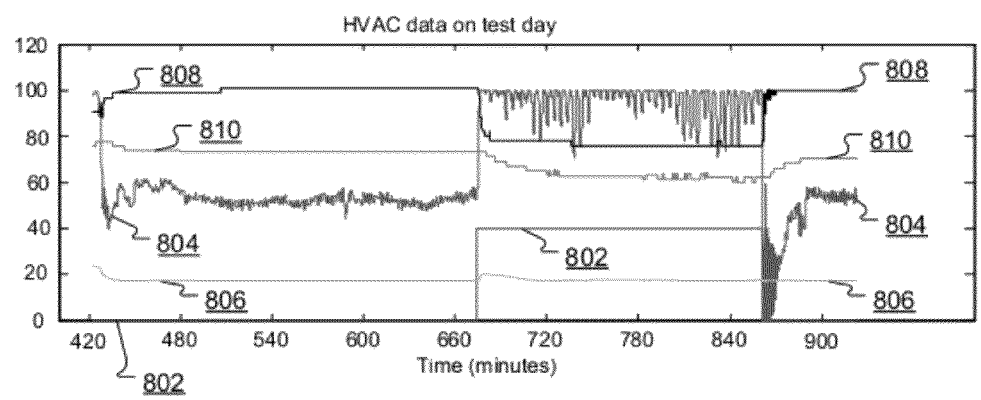
FIG. 8A is a graph showing sensor data from a further HVAC system test using a HMM fault detection process.
Figure 8B:
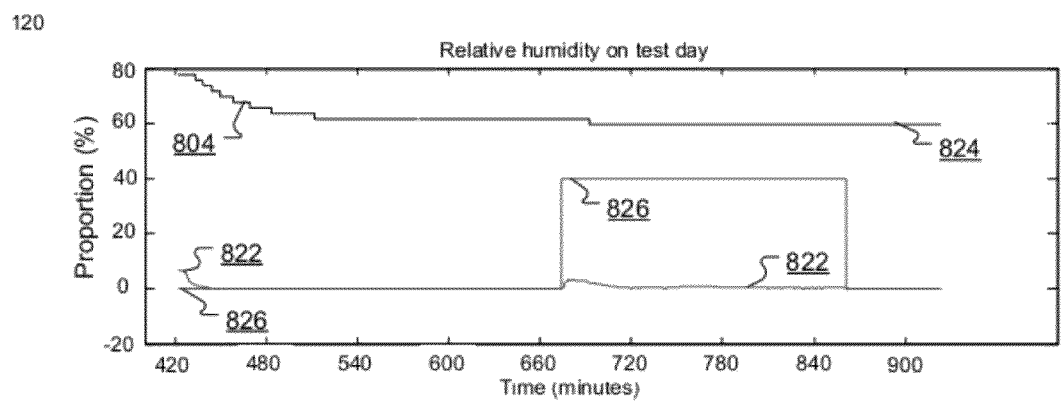
FIG. 8B is a graph showing further sensor data from the same test of FIG. 8A.

Graphs 800 and 820 of FIGS. 8A and 8B show the test data from this test. In graph 800 of FIG. 8A: line 802 plots the hot water valve (%); line 804 plots the chilled water valve (%); line 806 plots the supply air temperature (° C.); line 808 plots the supply air relative humidity (%); and line 810 plots the return air relative humidity (%). In graph 820 of FIG. 8B: line 822 plots the supply air temperature difference with its set points (° C.); line 824 plots fan speed (%); and line 826 plots the hot water valve (%).

Figure 8C:
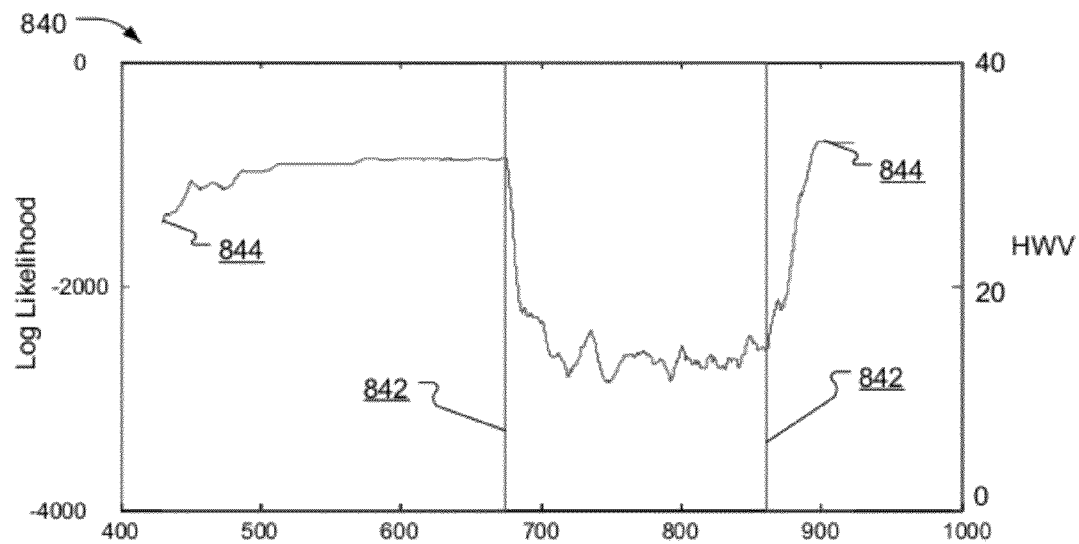
FIG. 8C is a graph showing the status of the hot water valve as the ground truth and the HMM log likelihood based on the data depicted in FIGS. 8A and 8B.

Graph 840 of FIG. 8C shows the HMM log likelihood based on the test data of FIGS. 8A and 8B. Line 842 of graph 840 plots the hot water valve (%), and line 844 plots the log likelihood. As can be seen, the log likelihood is lowest (representing a fault) during the period that the hot water valve was stuck.

Figure 8D:
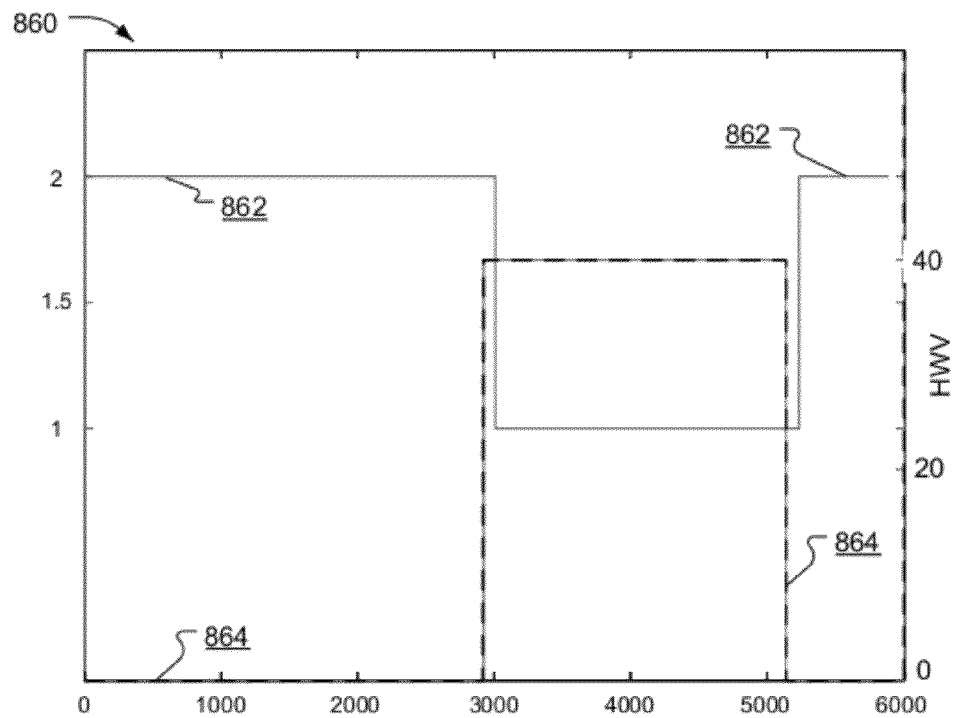
FIG. 8D is a graph showing fault detection data after using a K-Mean classifier to detect faults in the log HMM likelihood data of FIG. 8C.

Graph 860 of FIG. 8D shows the fault detection results after using a K-Mean classifier on the log likelihood data of FIG. 8C. Solid line 862 of graph 860 plots the ground truth, and broken line 864 marks the identified faults.

Other Fault Detection Techniques

As noted above, alternative methods to the DBN and HMM methods described above for detecting faults in multi-variable systems are possible.

For example, and again by way of non-limiting example, faults could be detected using support vector machine (SVM) methods (as described in C. Cortes and V. Vapnik. *Support Vector Networks*. Machine Learning 20, 273-297, 1995), methods using Kalman filters (as described in Fredrik Gustafsson. *Adaptive Filtering and Change Detection*, Wiley, 2001).

Fusion of Preliminary Fault Detection Data

Following the preliminary fault detection/diagnosis processes, the data from the individual fault detection processes may be aggregated or fused. Doing so may increase the reliability of the fault detection/diagnosis results obtained from the processing of the live/operational data in accordance with the various fault detection models.

Generally speaking, the purpose of aggregation of information is to meaningfully summarize and simplify a corpus of data, whether that data is derived from a single source or multiple sources. Familiar examples of aggregation techniques include arithmetic averages, geometric averages, harmonic averages, maximum values, and minimum values. Combination rules are special types of aggregation methods for data obtained from multiple sources, as is the case in a multi-variable system.

Use of Dempster-Shafer data fusion techniques will be discussed in detail below to illustrate this aspect of the present invention. It will be appreciated, however, that alternative fusion methods/techniques/theory could be used. For example, Kalman Filter theory (as described, for example, in J. Z. Sasiadek and P. Hartana. *Sensor Data Fusion Using Kalman Filter*." In: *Proceedings of the Third International Conference on Information Fusion*, Vol. 2, pages 19-25, 2000.), or Neural Network techniques (as described, for example, in A. Jabbari, R. Jedermann, and W. Lang, *Neural Network based Data Fusion in Food Transportation System*. 11th International Conference on Information Fusion, Cologne, Germany, 2008, pp. 1-8; or X. Chunli and G. Qiang, *Research on Data Fusion Diagnosis System Based on Neural Network and D-S Evidence Theory*. IEEE Circuits and Systems International Conference on Testing and Diagnosis, 2009, pp 1-4) could be used.

Dempster-Shafer Data Fusion

Dempster-Shafer theory provides for a mathematical representation of uncertainty. Unlike traditional probabilistic theory, Dempster-Shafer theory deals with measures of "belief", and is based on the non-classical idea of "mass" as opposed to probability.

Dempster-Shafer theory does not require an assumption regarding the probability of the individual constituents of the set or interval. As such, Dempster-Shafer theory provides a valuable tool for the evaluation of risk and reliability in engineering applications when it is not possible to obtain precise measurement from experiments, or when knowledge is obtained from expert elicitation.

An important aspect of Dempster-Shafer theory is the combination of evidence obtained from multiple sources and the modelling of conflict between those sources. Dempster-Shafer also allows for alternative scenarios than "yes" and "no", such as "unknown", which allow for more nebulous system states.

In the present embodiment, Dempster-Shafer theory is applied to the outputs of the various fault detection processes.

Basic Probability Assignment—Mass Assignment

Dempster-Shafer theory requires a preliminary assignment of masses that reflects initial knowledge of the system, including the "unknown" state. This is similar to the requirement for prior probabilities when using Bayes theory.

Basic probability assignment (also called basic belief mass), m, is a measure representing the support for, or confidence in, a hypothesis. If $\theta$ is the frame of discernment, then $2^\theta$ is the power set (the set of all subsets of $\theta$, including the empty set $\Phi$). The elements of the power set represent propositions concerning the actual state of the system. A belief mass is then assigned to each element of the power set: $m:2^\theta \rightarrow [0,1]$. This is a basic probability assignment (BPA), if and only if the mass of the empty set is 0, and the masses of the remaining sets of the power set total 1:

$$\begin{cases} m(\Phi) = 0 \\ \sum_{H \in 2^\theta} m(H) = 1 \end{cases} \quad \text{(Equation 8)}$$

As discussed below, the frame of discernment for each fault detection processes is: $\theta = \{\text{faultOperation, normalOperation}\}$.

It is noted that the BPA is not in general a Bayesian probability. Rather, BPA m(H) is an expression of the level of confidence exactly in a specific hypothesis H. The BPA does not include the confidence in any particular subset of that hypothesis. Consider, for example, a four-hypothesis frame of discernment $\{\omega_1, \omega_2, \omega_3, \omega_4\}$. A statement $m(\omega_1 \omega_2) = 0.6$ describes only the confidence that either the hypothesis $\omega_1$ or $\omega_2$ is true; it does not imply any specific support measure value for $\omega_1$ or $\omega_2$ alone (which are subsets of the set ($\omega_1 \omega_2$) and, by definition, have their own masses).

Furthermore, in contrast to typical Bayesian approaches, where an assignment of probability to a specific hypothesis implies the amount of probability assigned to its negation:

$$p(H) = q \quad \text{(Equation 9)}$$
$$\Rightarrow$$
$$p(\overline{H}) = 1 - q$$

the commitment of a BPA mass to a hypothesis does not imply commitment of the remaining mass to its negation, i.e., $$m(H) = q \quad \text{(Equation 10)}$$
$$\not\Rightarrow$$
$$m(\overline{H}) = 1 - q$$

The elements of the power set (i.e. the set of all subsets) can be taken to represent propositions of interest by containing all and only the states in which this proposition is true.

Rules for the Combination of Evidence—Dempster's Rule

As noted above, in a multi-variable system data is obtained from multiple sources. These multiple sources provide different assessments for the same frame of discernment and Dempster-Shafer theory is based on the assumption that these sources are independent.

Dempster-Shafer theory provides a rule for calculating the confidence measure of each state, based on data from different evidence. Dempster's rule of combination can be used as sensor fusion strategy, as given in Equations (11) and (12) below:

For two sensors (i.e. the fusion of two fault detection models):

$$m^{1,2}(C) = \frac{\sum_{A \cap B = C, C \neq \Phi} m^1(A) m^2(B)}{1 - k} \quad \text{(Equation 11)}$$

where $$k = \sum_{A \cap B = \Phi} m^1(A) m^2(B)$$

For three or more sensors (i.e. the fusion of three or more fault detection models):

$$m^{1,2,3}(D) = \frac{\sum_{A \cap B \cap C = D} m^1(A) m^2(B) m^3(C)}{1 - k} \quad \text{(Equation 12)}$$

where $$k = \sum_{A \cap B \cap C = \Phi} m^1(A) m^2(B) m^3(C)$$

K represents the basic probability mass associated with conflict. This is determined by the summing of the products of the BPA's of all sets where the intersection is null. $m^{1,2}(C)$ is the new evidence updated by the evidence sources $m^1(A)$ from sensor 1 and $m^2(B)$ from sensor 2; and $m^{1,2,3}(D)$ is the new evidence updated by the evidence sources $m^1(A)$ from sensor 1, $m^2(B)$ from sensor 2 and $m^3(C)$ from sensor 3.

Unlike Bayes theory, Dempster-Shafer theory explicitly allows for an undecided state of knowledge. This is of relevance as in detecting faults in multi-variable systems it can be safer to be undecided about what a target is rather than to decide wrongly and act accordingly with what might be disastrous consequences.

Support and Plausibility

Dempster-Shafer theory also uses notions of support (described in equation 13 below) and plausibility (described in equation 14 below). The support for a target "A" is defined to be the total mass of all states implying the "A" state. Plausibility is defined as the total mass of all states that don't contradict the "A" state. The quantity spt(A) can be interpreted as a global measure of one's belief that hypothesis A is true, while pls(A) can be viewed as the amount of belief that could potentially be placed in A, if further information became available. The support is a kind of loose lower limit to the uncertainty. On the other hand, a loose upper limit to the uncertainty is the plausibility.

$$spt(A) = \sum_{B|B \subseteq A} m(B) \quad \text{(Equation 13)}$$

$$pls(A) = \sum_{B|A \cap B \neq \Phi} m(B) \quad \text{(Equation 14)}$$

In addition to deriving these measures from the basic probability assignment (m), support and plausibility can be derived from each other. For example, Plausibility can be derived from support in the following way:

$$pls(A) = 1 - spt(\overline{A}) \quad \text{(Equation 15)}$$

where $\overline{A}$ is the classical complement of A. This definition of Plausibility in terms of Belief comes from the fact that all basic assignments must sum to 1. I.e.:

$$spt(\overline{A}) = \sum_{B|B \subseteq \overline{A}} m(B) = \sum_{B|B \cap A = \Phi} m(B) \quad \text{(Equation 16)}$$

$$\sum_{B|B \cap A \neq \Phi} m(B) = 1 - \sum_{B|B \cap A = \Phi} m(B) \quad \text{(Equation 17)}$$

Fault Detection Using Dempster-Shafer Theory

The use of Dempster-Shafer theory to the process the results from the preliminary fault detection processes will now be discussed.

In fusing the preliminary fault detection results, we define θ={faultOperation,normalOperation} as the set of local elements that can be detected by each fault detection model used (e.g. the DBN, HMM, and/or other fault detection processes). As discussed above, the power set of θ, denoted as $2^\theta$, is the set of all possible sub-sets of θ including the empty set Φ:

$$2^\theta = \{\Phi, \{\text{faultOperation}\}, \{\text{normalOperation}\}, \{\text{unknown}\}\} \quad \text{(Equation 18)}$$

where
{unknown}={faultOperation}∪{normalOperation}

The Basic probability assignment is the prior knowledge possessed for each fault detection model. This is defined using faultOperation mass, normalOperation mass, and unknown mass (described below).

The faultOperation mass (equation 19) is defined as correct fault operation detection rate:

$$m^i(f) = \frac{K^i_{cf}}{N^i_{tf}} \quad \text{(Equation 19)}$$

where $m^i(f)$ is faultOperation belief mass from fault detection model i;

$N^i_{tf}$ is the total number of faults detected by fault detection model i; and $K^i_{cf}$ is the number of correct fault detections from fault detection model i.

The normalOperation mass (equation 20) is defined as correct normal operation detection rate:

$$m^i(n) = \frac{K^i_{nc}}{N^i_{tn}} \quad \text{(equation 20)}$$

where $m^i(n)$ is normalOperation belief mass from fault detection model i;

$N^i_{tn}$ is the total number of normal operations detected by fault detection model i; and $K^i_{nc}$ is the number of correct normal operation detections from fault detection model i.

The Unknown mass (equation 21) is defined as wrong fault and normal operation detection rate:

$$m^i(u) = \frac{K^i_{fw} + K^i_{nw}}{N^i_{tf} + N^i_{tn}} \quad \text{(Equation 21)}$$

where $m^i(u)$ is unknown belief mass from fault detection model i;

$K^i_{fw}$ is the number of wrong fault detections from fault detection model i; and $K^i_{nw}$ is the number of wrong normal operation detections from fault detection model i.

In order to satisfy the basic probability assignment condition of equation 8 above, each of the faultOperation mass, normalOperation mass, and Unknown mass is normalized as follows:

$$m^i(f)' = \frac{m^i(f)}{m^i(f) + m^i(n) + m^i(u)},$$

$$m^i(n)' = \frac{m^i(n)}{m^i(f) + m^i(n) + m^i(u)},$$

$$m^i(u)' = \frac{m^i(u)}{m^i(f) + m^i(n) + m^i(u)}$$

where $m^i(f)'$, $m^i(n)'$ and $m^i(u)'$ is the normalized mass.

Figure 9:
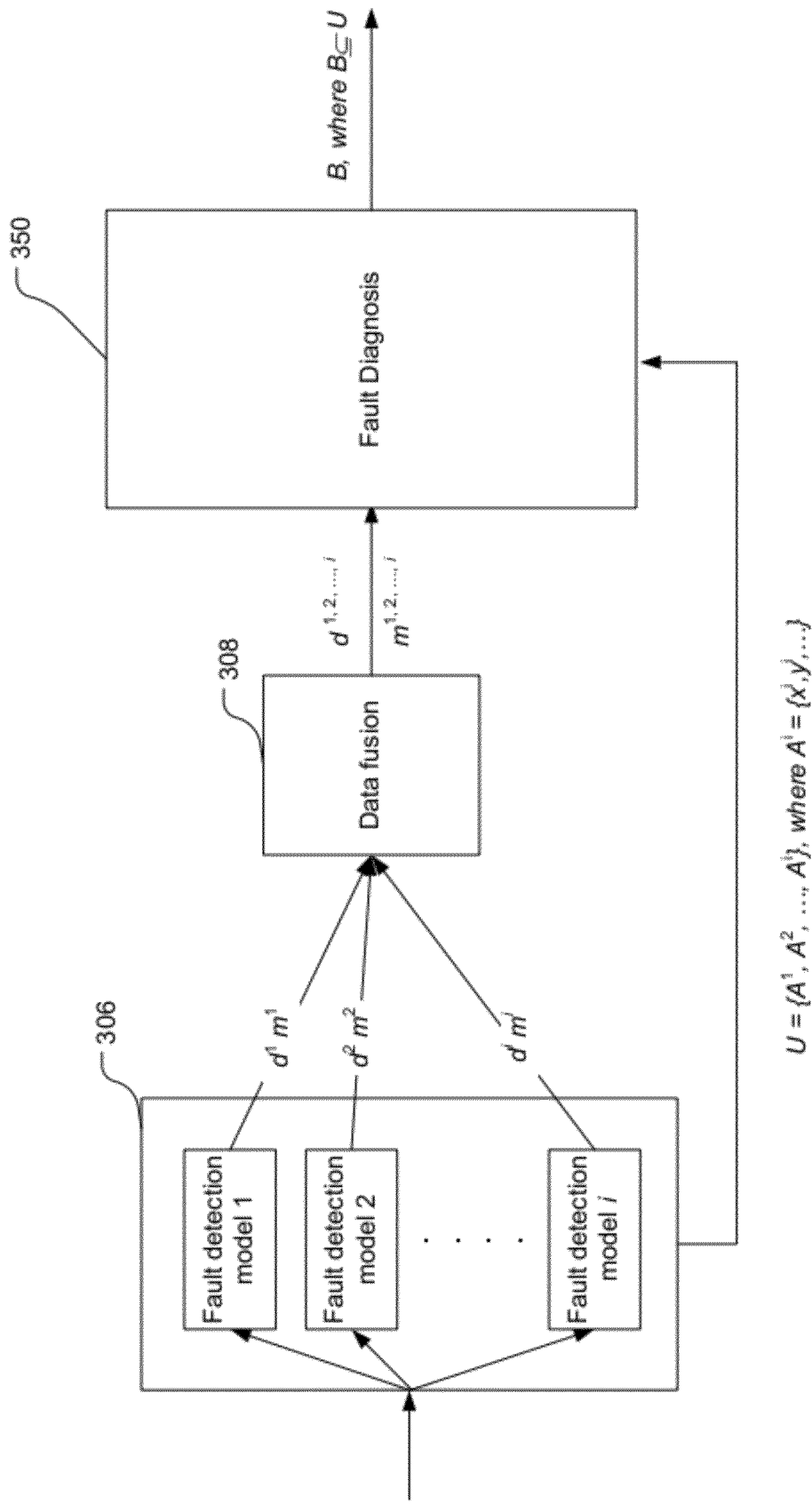
FIG. 9 depicts the use of the Dempster-Shafer method in detecting faults in a multi-variable system.

FIG. 9 depicts the use of the Dempster-Shafer method in detecting faults in a multi-variable system. The outputs of the fault detection processes are a detection result $d^i$ with a corresponding belief mass $m^i$ (calculated as per equations 19, 20, and 21 above).

By recursively using the Dempster-Shafer combination rule (equation 11 or 12 above as appropriate), the fault detection process outputs are fused to derive the fused detection result $d^{1,2,\ldots,i}$ (either a fault, normal operation, or unknown operation—which depending on the specific application may be interpreted as either a fault or normal operation) and fused belief mass $m^{1,2,\ldots,i}$ relevant to that result. Where two fault detection methods only are to be fused, equation 11 can be used, and where three fault detection methods are to be fused equation 12 can be used. If the output of more than 3 fault detection methods needs to be fused, then combinations of equation 11 and 12 are required. For example, if the output of four fault detection methods (FD 1, FD 2, FD 3, and FD 4) need to be combined: equation 11 is used to combine FD 1 and FD 2 (giving combination 1); equation 11 is used to combine FD 3 and FD 4 (giving combination 2); and equation 11 is used to combine combination 1 and combination 2 to provide the final detection result.

Where the fused evidence is interpreted as a fault in the system, fault diagnosis techniques can then be used to determine the nature of the fault in question.

By way of example, and depending on the fault detection processes in question, the outputs of the fault detection processes (detection results $d^i$ with corresponding belief masses $m^i$) may be processed at step 350 to determine the most likely cause of a fault in the multi-variable system. Processing step 350 uses the belief masses of the fused result to determine which of fault detection models appear to be the most relevant to the detected fault. This is done by including (or excluding) the fault detection models for further processing where the belief mass associated with the result of the fault detection model is sufficiently high (or low, depending on the type of model and expected results).

Once the most relevant fault detection models have been selected, the variables (or operational data points) from those detection models are selected as being those variables which, prima facie, are considered to be most closely associated (or disassociated) with the detected fault. This set of selected operational data points is referred to a set B in FIG. 9, B being a subset of the universal set U of all variables considered in the various models of the fault detection process).

The set B of operational data points can then be used to assist in further diagnosing the detected fault. For example, the set B of operational data points can be analysed/reviewed in conjunction with additional system knowledge using visualisation or other analysis techniques, assisting in isolating the fault to a specific subsystem, item of equipment, control/logic code section etc. The additional system knowledge may, for example, include information such as system schematics, functional specifications, control logic/code, lists of related subsystems etc.

The thresholds which determine whether a belief mass of a particular fault detection model is sufficiently high/low for inclusion/exclusion in the further processing are selected in order to try and optimise the set of operational data points returned in set B. The threshold values may be varied/tweaked to achieve this. In order to analyse the effect of varying the thresholds (and determine what appropriate threshold values are), visualisation techniques may be used to display what effect altering the threshold values has on the set of operational data points included in set B, and the relation of those data points with other system related information.

It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. A method for detecting faulty operation of a HVAC system, the method including:
   receiving operational data from a plurality of components of the HVAC system and feeding the operational data to a plurality of dynamic machine learning fault detection models;
   automatically mapping the HVAC system by processing the operational data using the plurality of dynamic machine learning fault detection models;
   training one or more of the fault detection models to learn patterns of normal operation of the HVAC system wherein faults are detected as deviations in the normal operation and training one or more of the fault detection models to learn patterns of faulty operation of the HVAC system wherein normal operation is detected as deviations in the faulty operation;
   generating a plurality of fault detection results noting the presence or absence of a fault through the detection of deviations in the patterns of normal operation or faulty operation of the HVAC system;
   each fault detection model using a plurality of variables to model one or more components of the HVAC system and being adapted to detect normal or faulty operation of an associated component or set of components of the HVAC system; and
   outputting the plurality of fault detection results noting the presence or absence of a fault through the detection of deviations in the patterns of normal operation and faulty operation of the HVAC system.

2. The method according to claim 1, wherein at least two fault detection models are adapted to detect normal or faulty operation of different associated components or sets of components.

3. The method according to claim 1, wherein the plurality of fault detection models includes:
   at least one general fault detection model adapted to detect normal or faulty operation of a general set of components of the HVAC system; and
   at least one specific fault detection model adapted to detect normal or faulty operation of a specific component or set of components of the HVAC system, wherein
   each specific fault detection model is associated with a general fault detection model, and
   the component or set of components associated with the specific fault detection model is a subset of or related to the set of components of the associated general fault detection model.

4. The method according to claim 3, wherein one of the at least one general fault detection models is adapted to detect normal or faulty operation of the HVAC system as a whole.

5. The method according to claim 3, wherein the operational data is only processed in accordance with the at least one specific fault detection model if processing the operational data in accordance with the associated general fault detection model indicates the existence of a fault.

6. The method according to claim 3, wherein if both a general fault detection process and a specific fault detection process associated with that general fault detection process indicate faulty operation of the HVAC system, the fault is diagnosed as a fault in the component or set of components associated with the specific fault detection process.

7. The method according to claim 1, wherein at least one of the plurality of fault detection models is selected from a group including dynamic Bayesian network based fault detection models and hidden Markov model based fault detection models.

8. The method according to claim 1, further including:
   processing the plurality of fault detection results in accordance with a data fusion process to generate a fused fault detection result, the fused fault detection result including information as to whether a fault is perceived in the operation of the HVAC system; and
   outputting said fused fault detection result.

9. The method according to claim 8, wherein the data fusion process is a Dempster-Shafer based data fusion process.

10. The method according to claim 1, further including:
    for each of the plurality of fault detection results calculating an associated confidence level; and using the calculated confidence levels to select which of the plurality of fault detection results is or are likely to be correct.

11. The method according to claim 10, further including fusing said plurality of confidence levels to provide a fused confidence level result; and using said fused confidence level result along with said fused fault detection result to determine the existence of and diagnose a fault in the HVAC system.

12. The method according to claim 10, wherein said confidence levels are belief masses calculated according to a Dempster-Shafer based process.

13. The method according to claim 10, further including:

selecting one or more of the fault detection results based on the confidence level associated with the fault detection result;

generating a set of variables, the set of variables including the variables modelled by the fault detection models which generated the selected fault detection results; and outputting said set of variables for use in diagnose a fault in the HVAC system.

14. The method according to claim 1, further including:

processing the operational data in accordance with at least one of the fault detection models multiple times to generate multiple results from said at least one fault detection model, and clustering the multiple results in accordance with a clustering algorithm in order to increase the reliability of the fault detection result.

15. The method according to claim 14, wherein the clustering algorithm is a K-means clustering algorithm.

16. The method according to claim 1, wherein if two fault detection results are contradictory, the method further includes:

flagging one or both of the fault detection models yielding the contradictory results; and modifying or retraining each flagged fault detection model.

17. The method according to claim 1, wherein if a fault detection result is identified as being a false alarm, the method further includes:

flagging the fault detection model yielding the result identified to be a false alarm; and modifying or retraining the flagged fault detection models.

18. The method according to claim 14, wherein if two fault detection results are contradictory, the method further includes:

flagging one or both of the fault detection models yielding the contradictory results;

modifying or retraining each flagged fault detection model; and using said flagged fault detection models to modify the clustering algorithm in order to improve the clustering of the multiple search results.

19. A method for detecting faulty operation of a multi-variable system, the method including:

receiving operational data from a plurality of components of the multi-variable system and feeding the operational data to a plurality of dynamic machine learning fault detection models;

automatically mapping the multi-variable system by processing the operational data using the plurality of dynamic machine learning fault detection models;

training one or more of the fault detection models to learn patterns of normal operation of the multi-variable system wherein faults are detected as deviations in the normal operation and training one or more of the fault detection models to learn patterns of faulty operation of the multi-variable system wherein normal operation is detected as deviations in the faulty operation;

generating a plurality of fault detection results noting the presence or absence of a fault through the detection of deviations in the patterns of normal operation or faulty operation of the multi-variable system;

each fault detection model using a plurality of variables to model one or more components of the multi-variable system and being adapted to detect normal or faulty operation of an associated component or set of components of the multi-variable system; and outputting the plurality of fault detection results noting the presence or absence of a fault through the detection of deviations in the patterns of normal operation and faulty operation of the multi-variable system.

20. The method according to claim 19, wherein at least two fault detection models are adapted to detect normal or faulty operation of different associated components or sets of components.

21. The method according to claim 19, wherein the plurality of fault detection models includes:

at least one general fault detection model adapted to detect normal or faulty operation of a general set of components of the multi-variable system; and at least one specific fault detection model adapted to detect normal or faulty operation of a specific component or set of components of the multi-variable system, wherein each specific fault detection model is associated with a general fault detection model, and the component or set of components associated with the specific fault detection model is a subset of or related to the set of components of the associated general fault detection model.

22. The method according to claim 21, wherein one of the at least one general fault detection models is adapted to detect normal or faulty operation of the multi-variable system as a whole.

23. The method according to claim 21, wherein the operational data is only processed in accordance with the at least one specific fault detection model if processing the operational data in accordance with the associated general fault detection model indicates the existence of a fault.

24. The method according to claim 21, wherein if both a general fault detection process and a specific fault detection process associated with that general fault detection process indicate faulty operation of the multi-variable system, the fault is diagnosed as a fault in the component or set of components associated with the specific fault detection process.

25. The method according to claim 19, wherein at least one of the plurality of fault detection models is selected from a group including dynamic Bayesian network based fault detection models and hidden Markov model based fault detection models.

26. The method according to claim 19, further including:

processing the plurality of fault detection results in accordance with a data fusion process to generate a fused fault detection result, the fused fault detection result including information as to whether a fault is perceived in the operation of the multi-variable system; and outputting said fused fault detection result.

27. The method according to claim 26, wherein the data fusion process is a Dempster-Shafer based data fusion process.

28. The method according to claim 19, further including:

for each of the plurality of fault detection results calculating an associated confidence level; and using the calculated confidence levels to select which of the plurality of fault detection results is or are likely to be correct.

29. The method according to claim 28, further including fusing said plurality of confidence levels to provide a fused confidence level result; and
using said fused confidence level result along with said fused fault detection result to determine the existence of and diagnose a fault in the multi-variable system.

30. The method according to claim 28, wherein said confidence levels are belief masses calculated according to a Dempster-Shafer based process.

31. The method according to claim 28, further including:
selecting one or more of the fault detection results based on the confidence level associated with the fault detection result;
generating a set of variables, the set of variables including the variables modelled by the fault detection models which generated the selected fault detection results; and
outputting said set of variables for use in diagnose a fault in the multi-variable system.

32. The method according to claim 19, further including:
processing the operational data in accordance with at least one of the fault detection models multiple times to generate multiple results from said at least one fault detection model, and
clustering the multiple results in accordance with a clustering algorithm in order to increase the reliability of the fault detection result.

33. The method according to claim 32, wherein the clustering algorithm is a K-means clustering algorithm.

34. The method according to claim 19, wherein if two fault detection results are contradictory, the method further includes:
flagging one or both of the fault detection models yielding the contradictory results; and
modifying or retraining each flagged fault detection model.

35. The method according to claim 19, wherein if a fault detection result is identified as being a false alarm, the method further includes:
flagging the fault detection model yielding the result identified to be a false alarm; and
modifying or retraining the flagged fault detection models.

36. The method according to claim 34, wherein if two fault detection results are contradictory, the method further includes:
flagging one or both of the fault detection models yielding the contradictory results;
modifying or retraining each flagged fault detection model; and
using said flagged fault detection models to modify the clustering algorithm in order to improve the clustering of the multiple search results.

37. The method according to claim 19, wherein the multi-variable system is selected from a group including: a HVAC system; a refrigeration system; an energy distribution system; an automated lighting system; a security/alarm system; a smoke/fire detection system; and a gas detection system.

38. A method for detecting faulty operation of a multi-variable system, the method including:
receiving operational data from a plurality of components of the multi-variable system and feeding the operational data to a plurality of dynamic machine learning fault detection models;
automatically mapping the multi-variable system by processing the operational data using the plurality of dynamic machine learning fault detection models;
training one or more of the fault detection models to learn patterns of normal operation of the multi-variable system, wherein faults are detected as probabilistic deviations in operational data and normal operation is detected as probabilistic matches in operational data, and training one or more of the fault detection models to learn patterns of faulty operation of the multi-variable system, wherein normal operation is detected as probabilistic deviations in operational data and faulty operation is detected as probabilistic matches in operational data;
generating a plurality of fault detection results noting the presence or absence of a fault through the detection of deviations in the patterns of normal operation or faulty operation of the multi-variable system;
each fault detection model using a plurality of variables to model one or more components of the multi-variable system and being adapted to detect normal or faulty operation of an associated component or set of components of the multi-variable system; and
outputting the plurality of fault detection results noting the presence or absence of a fault.

39. The method according to claim 38 wherein generating the plurality of fault detection results includes noting a type of fault and the outputting the plurality of fault detection results includes noting the type of fault.

* * * * *